(12) United States Patent
Tobiason et al.

(10) Patent No.: US 7,307,736 B2
(45) Date of Patent: *Dec. 11, 2007

(54) SCALE FOR USE WITH A TRANSLATION AND ORIENTATION SENSING SYSTEM

(75) Inventors: Joseph Daniel Tobiason, Woodinville, WA (US); Michelle Mary Milvich, Seattle, WA (US); Vidya Venkatachalam, Bellevue, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 178 days.

This patent is subject to a terminal disclaimer.

(21) Appl. No.: 10/815,893

(22) Filed: Mar. 31, 2004

(65) Prior Publication Data

US 2005/0219554 A1    Oct. 6, 2005

(51) Int. Cl.
*G01B 11/14* (2006.01)
(52) U.S. Cl. ..................... 356/614; 356/622
(58) Field of Classification Search ........ 356/614–622, 356/145; 250/559.27, 206.1, 216, 227.11
See application file for complete search history.

(56) References Cited

U.S. PATENT DOCUMENTS

| | | | |
|---|---|---|---|
| 3,661,465 A * | 5/1972 | Groh | 356/389 |
| 5,104,225 A | 4/1992 | Masreliez | |
| 5,453,838 A | 9/1995 | Danielian et al. | |
| 6,642,506 B1 | 11/2003 | Nahum et al. | |
| 7,075,097 B2 * | 7/2006 | Tobiason et al. | 250/559.27 |
| 2002/0105656 A1 | 8/2002 | Nahum et al. | |
| 2002/0179819 A1 | 12/2002 | Nahum | |

(Continued)

OTHER PUBLICATIONS

Dépret, B., et. al., "Characterization and Modelling of the Hollow Beam Produced by a Real Conical Lens," *Opt. Commun.* 211:31-38, Oct. 1, 2002.

(Continued)

*Primary Examiner*—Gregory J. Toatley, Jr.
*Assistant Examiner*—Tri Ton
(74) *Attorney, Agent, or Firm*—Christensen O'Connor Johnson Kindness PLLC

(57) ABSTRACT

A position sensor using a novel structured light generating scale or target member is provided. An imaging array is capable of measuring the relative translation and orientation of the structured light generating scale or target member in X, Y, Z, yaw, pitch, and roll ("6D") simultaneously, and with high precision. The target member includes an array of lenses that provide an array of structured light patterns that diverge, converge, or both, to change the size of the corresponding structured light image as a function of the "Z" coordinate of the relative position, in various embodiments. The X-Y position of each individual structured light image on the imaging array varies with the relative X-Y position of the structured light generating target member, and the shape of structured light image changes as a function of the relative angular orientation. Accordingly, three or more structured light images analyzed in the same image are usable to determine a 6D measurement between the structured light generating target member and the array detector. X and Y displacement of the target member can be accumulated by known methods and the other 6D measurement components are absolute measurements at any position.

17 Claims, 19 Drawing Sheets

U.S. PATENT DOCUMENTS

2003/0026457 A1 2/2003 Nahum
2003/0026458 A1 2/2003 Nahum
2003/0090681 A1 5/2003 Jones et al.
2003/0095710 A1 5/2003 Tessadro
2004/0032596 A1* 2/2004 Lange et al. ............... 356/622

OTHER PUBLICATIONS

Reed, J.M., and S. Hutchinson, "Image Fusion and Subpixel Parameter Estimation for Automated Optical Inspection of Electronic Components," *IEEE Trans. Ind. Electron.* 43(3):346-354, Jun. 1996.

* cited by examiner

SCALE FOR USE WITH A TRANSLATION AND ORIENTATION SENSING SYSTEM

FIELD OF THE INVENTION

This invention relates generally to optical position sensors, and, more particularly, to a multi-axis optical position sensor utilizing a structured light scale or target.

BACKGROUND OF THE INVENTION

Various accurate 2-dimensional (2D) optical position sensing systems are known. For example, one 2D incremental position sensor using a 2D grating scale and providing high resolution and high accuracy for sensing translation in an X-Y plane is disclosed in U.S. Pat. No. 5,104,225 to Masreliez, which is incorporated herein by reference in its entirety. Such a system is essentially an orthogonal combination of well known 1-dimensional (1D) optical encoder "incremental" measurement techniques that sense the position of a readhead within a particular period of a periodic scale grating for high resolution and continuously increment and decrement a count of the number of periods of the periodic scale that are traversed during a series of movements, in order to continuously provide a net relative displacement between the readhead and scale. However, such systems cannot sense the "z-axis" separation between a readhead and scale.

A very limited number of types of optical position sensors capable of sensing more than two degrees of freedom of a relative position of an object are known. One system comprising a probe that can sense relative position for up to 6 degrees of freedom is disclosed in U.S. Pat. No. 5,453,838 to Danielian and Neuberger. The '838 patent discloses a probe using a fiber optic bundle, with individual fibers or sets of fibers acting as individual intensity sensing channels. The individual intensity signals vary with X-Y motion of an illuminated target surface, as well as with the proximity of each fiber to the illuminated target surface along a direction normal to the surface. However, the probe disclosed in the '838 patent provides relatively crude measurement resolution and a limited sensing range for "z-axis" separation and orientation between the probe and a target surface.

Known dual-camera "stereoscopic" triangulation systems can sense relative position for up to 6 degrees of freedom. However, such known dual-camera systems are generally relatively large systems developed for measuring macroscopic objects and/or their positions, which do not scale well to relatively compact precision position measuring systems usable in close proximity to their target object. Furthermore, the triangulation arrangement of such known systems generally constrains the relationship between the z-axis measurement resolution and the z-axis measurement range in a restrictive and undesirable manner.

Systems that can image an object and determine x-y position from a feature in the image and z-axis position and orientation based on varying magnification in the image are also known. However, the magnification arrangement of such known systems generally constrains the relationship between the z-axis measurement resolution and the z-axis measurement range in a restrictive and undesirable manner, and introduces other problems requiring special image processing and/or compensation in order to accurately measure a relative position with up to 6 degrees of freedom.

SUMMARY OF THE INVENTION

The present invention is directed to providing a position sensor that overcomes the foregoing and other disadvantages. More specifically, the present invention is directed to an optical position sensor utilizing a scale or target member that emits a structured light pattern (also referred to as a structured light scale, structured light target, or structured light target member), and an imaging array (also referred to as a camera, image detector, optical detector or array detector), to provide high accuracy simultaneous measurements for up to 6 degrees of freedom for an object (multiple-dimension, or "6D", measurements), including any one of, or combination of, X, Y, Z, yaw, pitch, and roll.

Depending on the design parameters chosen for the structured light pattern and the imaging array, the applications of an optical position sensor according to this invention include, but are not limited to, precision position sensors for metrology, motion control systems and the like, as well as relatively lower resolution and/or longer range sensors usable for computer input devices, multi-degree-of-freedom manual machine controllers, macroscopic object ranging and orientation measurement systems, and the like.

In accordance with one aspect of the invention, the imaging array is positionable to input a structured light image (also referred to as a target image) arising from the structured light sources (also referred to target sources) on a target member. In various exemplary embodiments, the target sources are arranged in a two-dimensional periodic array on the target member.

In accordance with another aspect of the invention, the image on the array detector includes respective image features corresponding to respective target sources on the target member.

In accordance with another aspect of the invention, in various exemplary embodiments, the target sources create a diverging structured light pattern. In various other embodiments, the target sources create a converging structured light pattern. In various other embodiments, the target sources create a structured light pattern that converges and then diverges along the central axis of the structured light pattern.

In various exemplary embodiments, a target source comprises a refractive axicon point-like lens (an axicon point), a refractive axicon ring, a refractive faceted pyramidal-type point-like lens, a refractive polyhedral-like arrangement of prismatic "lines", an arrangement of one or more refractive prismatic "lines", or any combination thereof. In various other exemplary embodiments respective diffractive optical elements, that deflect light rays approximately like the corresponding respective refractive optical elements listed above, may be used instead of refractive optical elements.

In accordance with another aspect of the invention, a target source receives collimated light from a light source and outputs the structured light pattern.

In accordance with a further aspect of the invention, the target source further comprises a lens or lens portion that causes adjacent rays of the structured light to focus at a plane that is located approximately in the middle of a nominal measuring range along an axis of separation between the imaging array and the target member.

In accordance with a further aspect of the invention, in various embodiments where the target source is a point-like lens, the rays of the structured light pattern are arranged at a polar angle relative to an axis that extends from the target source along a direction normal to a face of the target member. The particular polar angle is determined by the characteristics of the point-like lens. The polar angle is furthermore the cone angle of a hypothetical cone with an apex proximate to the target source. Thus, in accordance with a further aspect of the invention, in various exemplary embodiments, the structured light image on the imaging detector (also referred to as an array detector) comprises a continuous, or segmented, circular or elliptical pattern formed where the hypothetical cone intersects with the plane of the optical detector elements of the imaging array. In various embodiments, the segments of the circular or elliptical pattern are essentially spots.

In accordance with a further aspect of the invention, the continuous or segmented circular or elliptical (ring-shaped) image corresponding to a target source has a size that varies with the separation along a direction parallel to an axis of separation between the imaging array and the target member. The size of the ring-shaped structured light image corresponding to a target source can thus be used to determine an absolute z-axis coordinate for a corresponding target source or other reference feature relative to the detection plane, or reference plane, of the imaging array. In accordance with a further aspect of the invention, the location of the center of the ring-shaped structured light image corresponding to a target source on the array detector can be used to determine the location of the corresponding target source along a plane parallel to the detection plane, or reference plane, of the imaging array, and can thus be used to determine the displacement of the target source relative to the detection plane, or reference plane, of the imaging array along an x-y plane. Thus, a set of (x,y,z) coordinates can be determined for any such target source, and given the (x,y,z) coordinates of three such target sources, a 6-degree-of-freedom relative position can be determined between a target member and a position measuring device according to this invention.

In accordance with another aspect of the invention, the structured light image corresponding to a target source is a slightly blurry image having respective radial intensity profiles comprising the intensity values of respective sets of image pixels of the ring-shaped image feature lying along respective radial directions extending from a nominal center of the ring shaped feature. In various exemplary embodiments according to this invention, a function of a circle or an ellipse is fitted to a set of respective peaks determined for the set of respective radial intensity profiles. In various embodiments, scaling in x and y is performed to correct for magnification or image aberrations before the respective peaks are determined. In either case, the resulting fit function provides a high accuracy estimate of the size (a radial dimension) and center location of the structured light image corresponding to a target source at a sub-pixel interpolation level, and thus can be used to determine the corresponding (x,y,z) coordinates of any corresponding target source, and the resulting relative position determination with a similar high accuracy.

In accordance with another aspect of the invention, a position sensing device including various elements outlined above provides images on the array detector that include at least two respective structured light image features corresponding to respective target sources, and when a separation between the position sensing device and the target member is increased, the size of each of the corresponding respective structured light image features increases on the array detector, but a spacing between respective nominal centers of the respective image features does not change on the array detector.

In accordance with another aspect of the invention, the target member comprises a plurality of respective unique target source patterns usable to uniquely identify a respective region of the target member.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
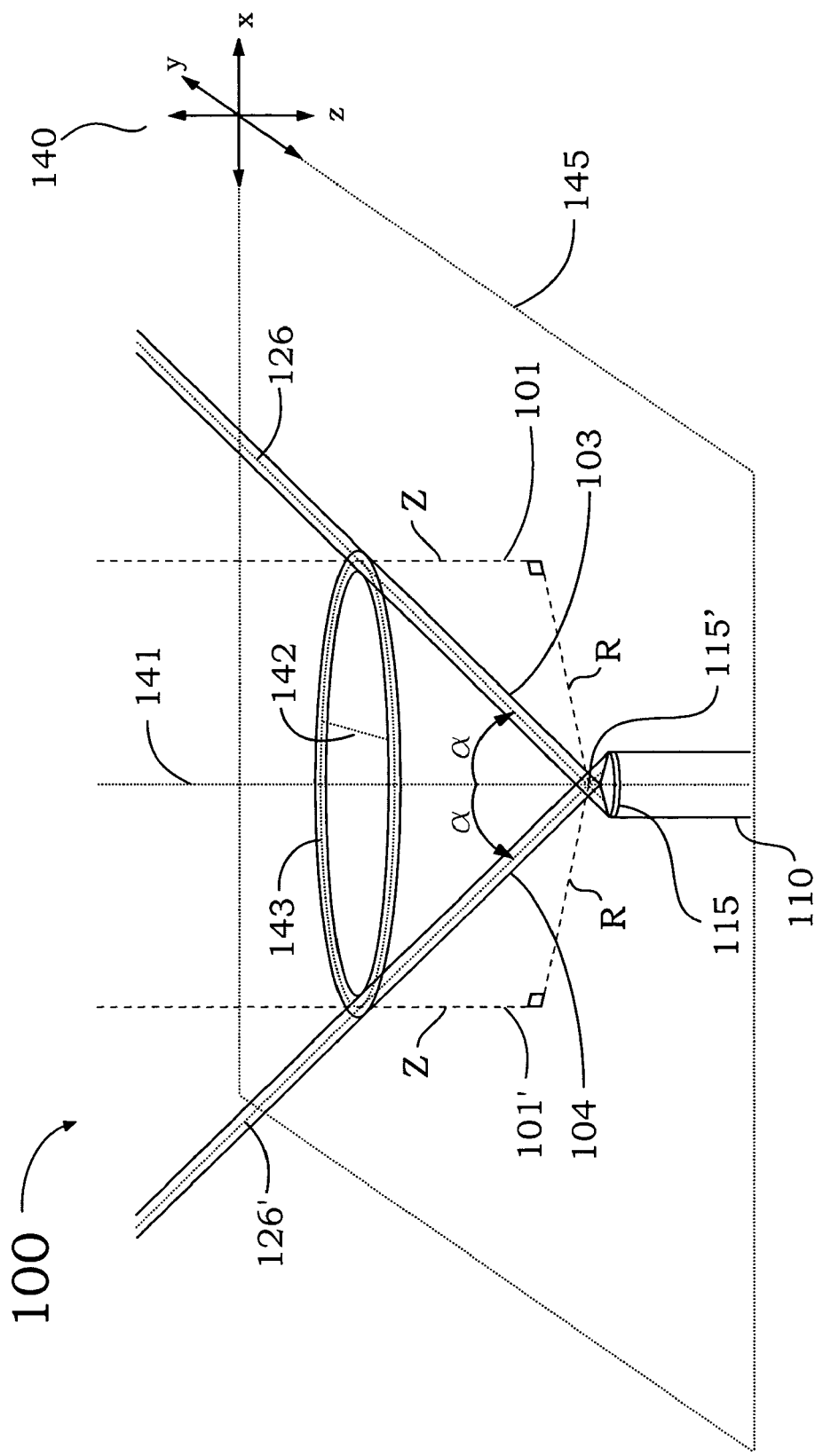
FIG. 1 is an isometric view showing an exemplary structured light pattern configuration that is usable according to this invention, and an axicon lens used to generate the structured light pattern.

FIG. 1 is an isometric view showing an exemplary structured light pattern configuration 100 that is usable in various position sensor embodiments according to this invention, including an axicon lens 115 that is used to generate a structured light cone 142. In various exemplary embodiments of a position sensor according to this invention, light propagates through a plurality of axicon lenses located on a target member, and each lens forms a structured light cone. As will be described in greater detail below, each respective structured light cone forms a ring-shaped image on a two-dimensional imaging array of the position sensor, and the image is indicative of the 3-dimensional position of the respective axicon lens that generates the structured light cone.

FIG. 1 shows two representative narrow beams of light rays, 103 and 104 which form respective portions of the structured light cone 142 that is formed when the axicon lens 115 is illuminated with collimated light 110. The location and direction of the narrow beams of light rays 103 and 104 are best represented by their central rays 126 and 126', respectively. It should be appreciated that the structured light cone 142 is actually a complete cone, in the embodiment shown in FIG. 1, consisting of a continuous distribution of light rays similar to the narrow beams of light rays 103 and 104. The structured light cone 142 has a central axis 141 and a cone angle α. The angle α is determined by the design of the axicon lens 115, as described below with reference to FIGS. 13 and 14.

A hypothetical plane 145 is also shown in FIG. 1. The hypothetical plane 145 is oriented normal to the cone axis 141 and coincides with the vertex of the structured light cone 142, which is at the focal point 115' of the light rays emitted from the axicon lens 115. Thus, the hypothetical plane 145 is also referred to as a light point plane, or target member light point plane, in the descriptions of various embodiments below. Because a target member light point plane coincides with the vertex (vertices) of the structured light cone(s) arising from the axicon lens(es) 115, or other similar target sources, it is a convenient plane for defining various coordinate relations between the location of the target sources and their corresponding structured light patterns and resulting structured light images.

An exemplary light ring 143 is shown in FIG. 1 at a location where the structured light cone 142 intersects with an intersection plane that is parallel to the hypothetical plane 145, at a distance Z from the hypothetical plane 145, along a direction normal to the hypothetical plane 145. In such a case, the light ring 143 is a circle having a radius R from the cone axis 141 to the locus of points where the central rays of the structured light cone 142, such as the central ray 126, intersect with the intersection plane.

In operation, the intersection plane described above is representative of the detection plane of an imaging array of a position sensor according to this invention, when the detection plane is oriented perpendicular to the cone axis 141, or equivalently, parallel to a target member light point plane represented by the hypothetical plane 145. For example, for such a configuration, when $Z=Z_1$ the operable pixels forming the operable structured light image will be a set of pixels forming a circle of radius $R_1=Z_1*\tan\alpha$ on the imaging array. If the separation between the focal point 115' and the imaging array is then increased to $Z=Z_2$, the operable pixels forming the operable structured light image will be a new set of pixels, forming a larger circle of radius $R_2=Z_2*\tan\alpha$.

Thus, more generally, it should be appreciated that in various position sensor arrangements according to this invention, a target source (such as the axicon lens 115) that is imaged onto the imaging array of a position sensor according to this invention gives rise to a corresponding structured light image feature having a size that varies in a manner corresponding to the separation between the target source and the imaging array of the position sensor.

In the presence of relative X-Y motion, the position of the nominal center of the circular structured light image corresponding to the target source will change on the imaging array. Thus, according to the foregoing description, a position sensor arrangement according to this invention can image as little as a single target source in various exemplary embodiments and provide an image on an imaging array that is usable to determine a 3-dimensional relative translational position between the single target source and the imaging array, and/or any component of that 3-dimensional relative position.

Figure 2:
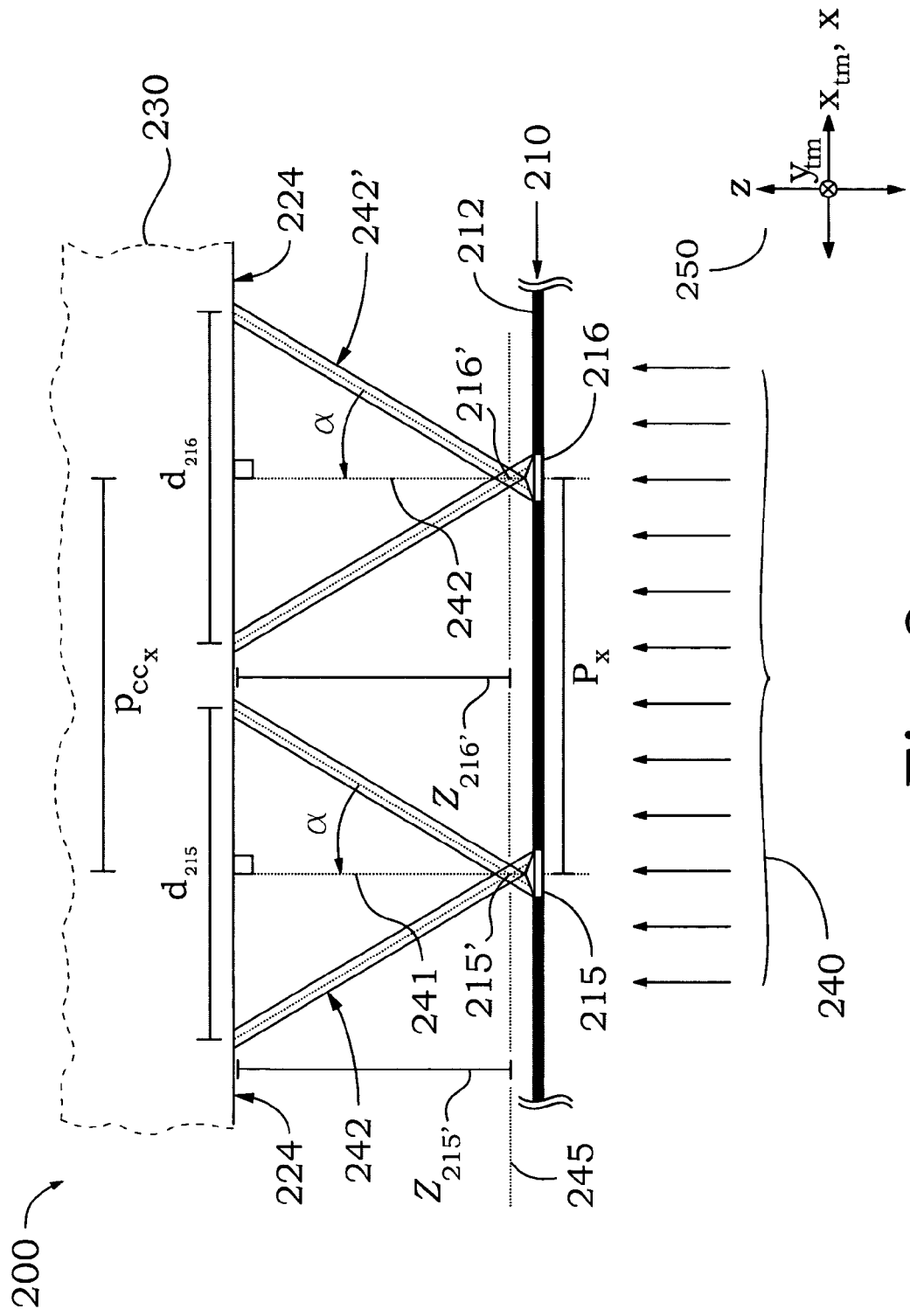
FIG. 2 is a detailed schematic view of a first exemplary embodiment of a position sensor arrangement using a structured light target member in accordance with this invention, along with various relevant coordinate dimensions applicable to a simplified relative position determination.

FIG. 2 shows a schematic side view of a first exemplary embodiment of a position sensor arrangement 200 according to this invention, along with various relevant coordinate dimensions applicable to a simplified relative position determination. As shown in FIG. 2, the position sensor arrangement 200 includes a target member 210 including two axicon lens target sources 215 and 216, an image detector 230 (also referred to as an imaging array), and collimated light 240 from a light source (not shown.) In order to illustrate the general nature of the relationship between the size of a structured light image and a z-coordinate corresponding to that image, the relative position arrangement shown in FIG. 2 illustrates an introductory case where the target member 210 is parallel to the plane of the detectors of the image detector 230. It should be appreciated that, in practice, the plane of the detectors of the image detector 230 will generally not be parallel to the plane of the target member 210. The case of a more general relative position determination is described further below with reference to FIGS. 4 and 5.

In the embodiment shown in FIG. 2, the target member 210 includes a plurality of target sources 215, 216, etc., similar to, and including, the axicon lens target sources 215 and 216, located on or in transparent portions or holes in an opaque substrate 212 formed of an opaque material or a material having an opaque coating, such that the collimated light 240 is transmitted only, or at least primarily, through the target sources. In various exemplary embodiments the plurality of target sources 215, 216, etc., are arranged in a periodic two-dimensional orthogonal array on the target member 210, with a period or pitch of $P_x$ along an axis $x_{tm}$ of the target member and a pitch of $P_y$ along an orthogonal axis $y_{tm}$ of the target member. In various exemplary embodiments, $P_x=P_y$, and both pitches may be referred to as P. Each axicon lens target source 215, 216, etc., operates in a manner analogous to the axicon lens 115, as previously described. Thus, each respective axicon lens target source 215, 216, etc., gives rise to a respective structured light cone 242, 242', etc., having a respective target source vertex 215', 216', etc., and a cone angle $\alpha$ that is determined by the design of the axicon lens target sources, as described elsewhere herein.

A light point plane 245 is defined to coincide with the target source vertices, 215' 216', etc., in the same manner as previously described for the hypothetical plane 145. The respective exemplary dimensions $Z_{215'}$ and $Z_{216'}$ represent the separation between the respective target source vertices 215' and 216' on the light point plane 245 and an image detector coordinate system reference plane 224, which coincides with the plane of the detectors of the image detector 230, in various embodiments described herein. The exemplary dimensions $Z_{215'}$ and $Z_{216'}$ are along the z-axis direction, that is, along the direction normal to the image detector coordinate system reference plane 224.

As shown in FIG. 2, the respective structured light cones 242, and 242' are received on and imaged at the image detector coordinate system reference plane 224, where they form respective ring-shaped images that have nominal diameters $d_{215}$ and $d_{216}$, respectively. Along a direction in the image detector plane 224 that is parallel to the $x_{tm}$-axis of the target member, the centers of the ring shaped images are separated by a dimension $pcc_x$. When the image detector coordinate system reference plane 224 and the target member 210 are parallel, as shown in FIG. 2, all the ring-shaped images are circles and all have the same nominal diameter. In general, the respective z-dimension Z corresponding to a respective target source may be determined based on the nominal diameter d of the image associated with that target source and the known cone angle $\alpha$, as:

$$Z = \frac{d}{2\tan\alpha} \quad \text{(Eq. 1)}$$

Methods for determining the nominal diameter d of a structured light image, as well as the nominal image center, are discussed further below.

In the general relative position case, when the target member 210 is not parallel to the image detector coordinate system reference plane 224, the center coordinates of the structured light images produced by the light cones 242, 242', etc., are not the x- and y-coordinates of the target source vertices 215', 216', etc., along the x-axis and y-axis defined by the image detector coordinate system. The geometric relationships for the general case are outlined below with reference to FIG. 4. However, for the simple relative position case shown in FIG. 2, where the target member 210 is parallel to the image detector coordinate system reference plane 224, the x- and y- coordinates of the target source vertices 215', 216', etc., along the x-axis and y-axis defined by the image detector coordinate system, are the same as the coordinates of the centers of the corresponding structured light images 242, 242', etc. Thus, at least for this simple case, it should be appreciated that the three-dimensional (x,y,z) coordinates in the image detector coordinate system can be determined for each target source vertex (215', 216', etc.) on the light point plane 245. The more general case is described further below with reference to FIG. 4.

FIGS. 3A-3F are schematic diagrams illustrating one exemplary pattern of target sources and/or target source vertices included on a target member according to this invention, and various resulting ring image patterns, viewed along the direction of the z-axis of the image detector coordinate system, that are produced by a position sensor arrangement using a structured light target member according to this invention. Each respective ring image pattern corresponds to a respective position of the structured light target member relative to the imaging array of the position sensor arrangement. As described above with reference to FIGS. 1 and 2, an axicon lens target source on the target member will produce an image that is ring-shaped at the image detector. As previously outlined, when the target member is parallel to the image detector coordinate system reference plane, that is the plane of the detectors of the image detector, the ring-shaped images are circles. However, more generally, for a conical structured light pattern, when the target member is not parallel to the plane of the detectors of the image detector, the ring-shaped image is elliptical. However, when the angle of tilt of the target member relative to the plane of the plane of the detectors of the image detector is less than approximately 25 degrees, the minor axis of the ellipse is at least 90% as large as the major axis, and the ellipse can be approximated by a circle, for purposes of illustration.

Figure 3A:
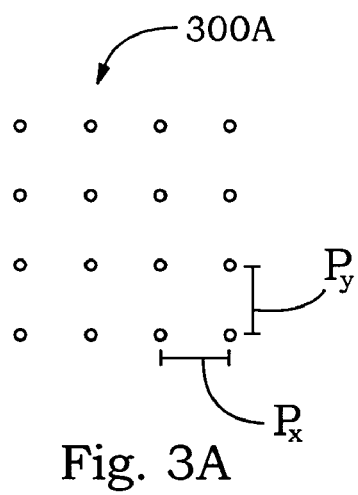
FIGS. 3A-3F are schematic diagrams illustrating various ring image patterns that are produced by a position sensor arrangement using a structured light target member according to this invention, for various positions of the structured light target member relative to an imaging array of the position sensor arrangement.

FIG. 3A shows a view normal to a target member and/or light point plane as previously described. The small circles can be taken to represent target sources and/or target source vertices (also referred to as light points), arranged in pattern 300A which may be used as a target pattern for a target member according to this invention. The target source vertices are arranged according to a periodic pitch $P_x$ along an x-axis direction $x_{tm}$ of the target member, and a periodic pitch $P_y$ along an orthogonal y-axis direction $x_{tm}$ of the target member, in the embodiment shown in FIG. 3A.

The pattern 300A is the basis for the exemplary images shown in FIGS. 3B-3F. The small crosses superimposed on the schematic images 300B-300F represent the approximate locations of the respective target source vertices that correspond to each respective ring-shaped structured light image, as projected along the z-axis to the plane of the detectors. In general, the dimension(s) of each respective ring-shaped image depends on the angle of tilt between the detector plane of the image detector and the target member, the operable cone angle $\alpha$, and the dimension Z between the detector plane and the corresponding respective target source vertex.

Figure 3B:
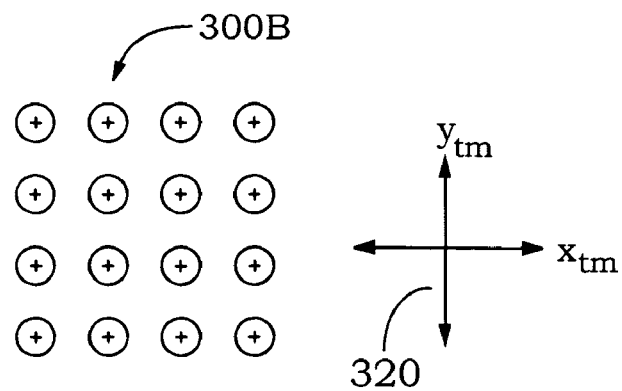

FIG. 3B shows an image 300B. The image 300B shows an array of ring-shaped (circular) structured light images that are formed at the image detector when the plane of the detector array is approximately parallel with the plane of the target member and/or light point plane and at some separation from the light point plane along the z-axis.

Figure 3C:
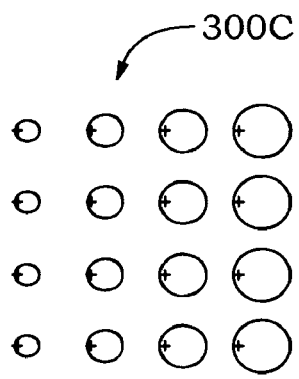

FIG. 3C shows an image 300C. The image 300C shows an array of ring-shaped (elliptical) structured light images that are formed at the image detector when the light point plane is at some separation from the detector plane along the z-axis, and rotated about the $y_{tm}$ axis, relative to the detector plane. The sizes of the structured light images indicate that the Z dimensions/coordinates of the right-most target source vertices are greater than those of the left-most target source vertices.

Figure 3D:
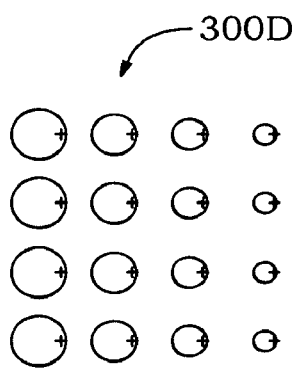

FIG. 3D shows an image 300D. The image 300D shows an array of ring-shaped (elliptical) structured light images that are formed at the image detector when the light point plane is at some separation from the detector plane along the z-axis, and rotated about the $y_{tm}$ axis, relative to the detector plane. The sizes of the structured light images indicate that the Z dimensions/coordinates of the left-most target source vertices are greater than those of the right-most target source vertices.

Figure 3E:
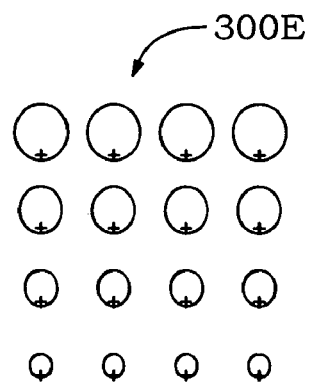

FIG. 3E shows an image 300E. The image 300E shows an array of ring-shaped (elliptical) structured light images that are formed at the image detector when the light point plane is at some separation from the detector plane along the z-axis, and rotated about the $x_{tm}$ axis, relative to the detector plane. The sizes of the structured light images indicate that the Z dimensions/coordinates of the target source vertices toward the top of the image are greater than those of target source vertices toward the bottom of the image.

Figure 3F:
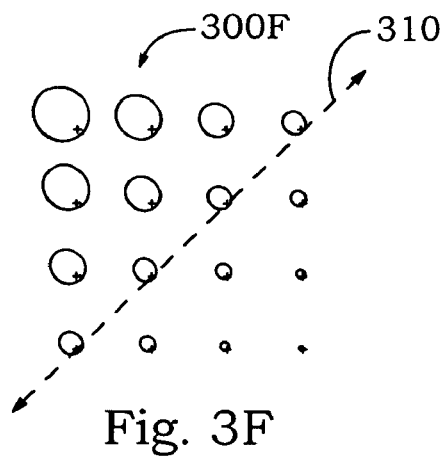

FIG. 3F shows an image 300F. The image 300F shows an array of ring-shaped (elliptical) structured light images that are formed at the image detector when the light point plane is at some separation from the detector plane along the z-axis, and rotated about an axis 310 that is parallel to the detector plane and at an angle approximately 45 degrees counterclockwise from the $x_{tm}$ axis. The sizes of the structured light images indicate that the Z dimensions/coordinates of the target source vertices toward the top left corner of the image are greater than those of target source vertices toward the bottom right corner of the image.

As shown in FIGS. 3C-3F, the spacing between the centers of the elliptical structured light images along the direction of the major axes of the ellipses is not the same as the spacing between the projected target source vertices (represented by the small crosses) along the direction of the major axes. In general the spacing between the centers of the ellipses along the direction of the major axes is approximately (just a very small amount greater than) the distance between the projected target source vertices along the direction of the major axes divided by the cosine of the angle of rotation (the tilt angle) between the light point plane and the detector plane about an axis parallel to the direction of the minor axes of the ellipses. However, it should be appreciated that the spacing between the centers of the ellipses is not the best indicator of relative rotation (tilt), particularly for small rotation angles.

It should be appreciated that a particularly strong feature of this invention is that the size of a respective ring-shaped structured light image is a very sensitive indicator of the Z dimension/coordinate of the corresponding respective target source vertex. Thus, the various angular components of the rotation of the scale member relative to the position sensor are determined to a high degree of accuracy from these respective Z coordinates, in various exemplary embodiments according to this invention. In contrast to the previously described spacing along the direction of the major axes of the ellipses, it should be appreciated that the spacing between the centers of the elliptical structured light images along the direction of the minor axes of the ellipses is the same as the spacing between the projected target source vertices along the direction of the minor axes. It will be appreciated that this is because the minor axes are aligned along a direction where there is no angle of rotation (tilt angle) between the light point plane and the detector plane. That is the light point plane is not rotated relative to the detector plane about an axis parallel to the direction of the major axes of the ellipses. Thus, the dimension of the minor axis of an elliptical structured light image closely corresponds to the dimensions $d_{215}$ and $d_{216}$ shown in FIG. 2 (within approximately 1% when the rotation about the minor axis is 25 degrees), and the Z coordinate of a respective target source vertex corresponding to a respective elliptical structured light image can be accurately estimated by EQUATION 1, when the value used for d is the dimension of the minor axis of the ellipse.

Figure 4:
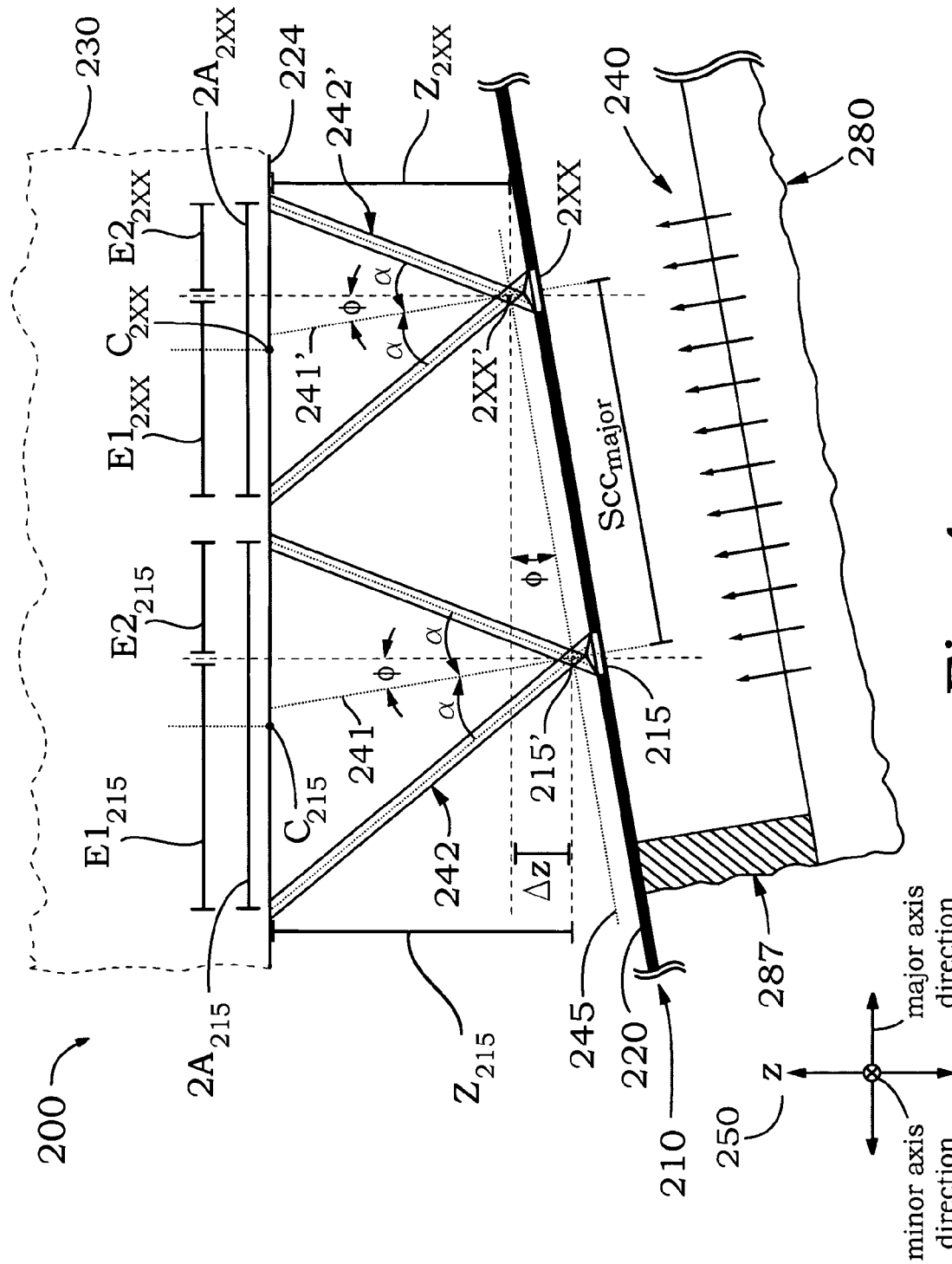
FIG. 4 is a detailed schematic view of the first exemplary embodiment of a position sensor arrangement shown FIG. 2, viewed along the direction of the minor axis of an elliptical structured light image according to this invention, where the target member is rotated about an axis along the direction of the minor axis, along with various relevant coordinate dimensions.
Figure 5:
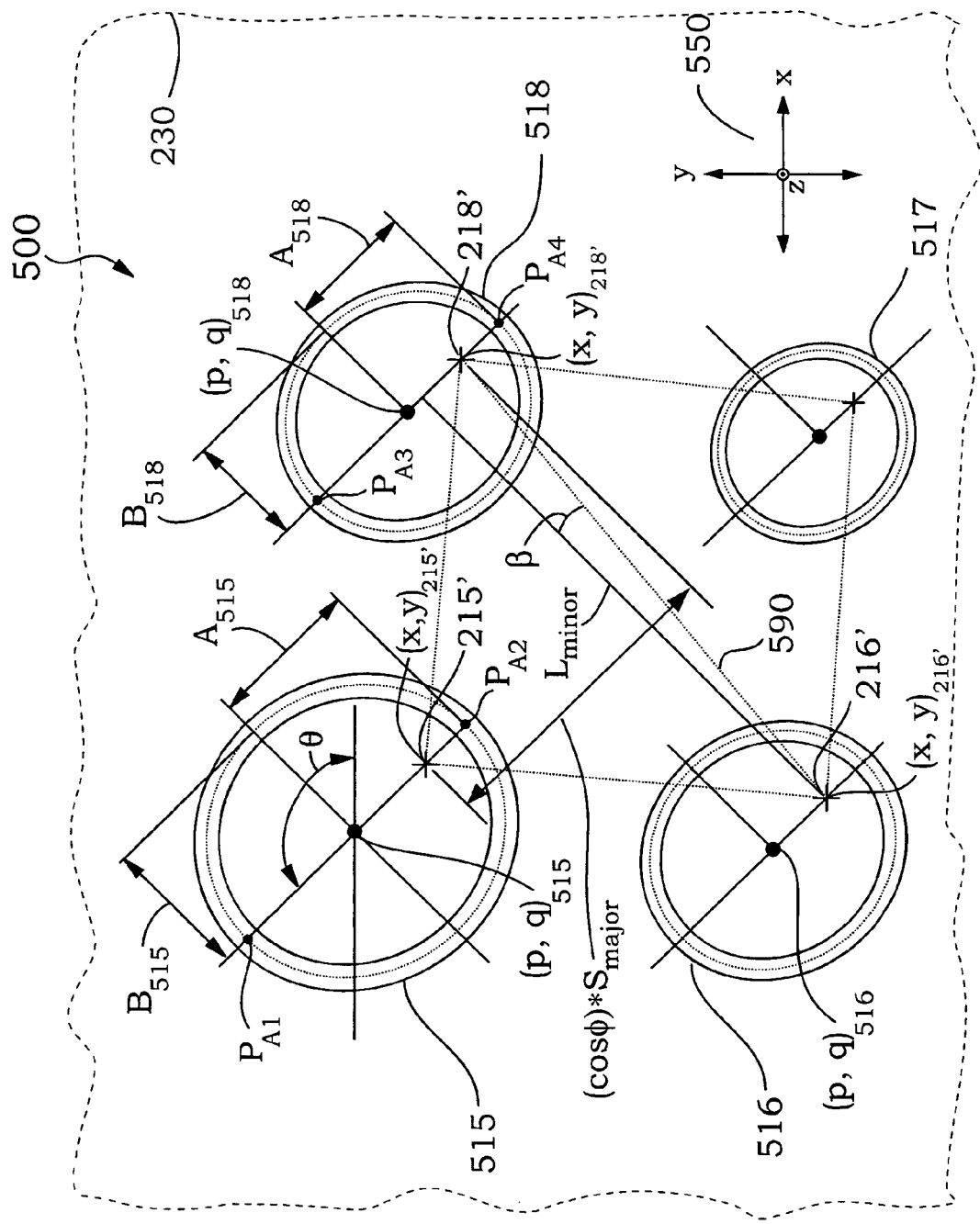
FIG. 5 shows an illustration of a portion of a image detector image that includes four elliptical structured light images, arranged to correspond approximately to the structured light target member and position sensor arrangement shown in FIG. 4, along with various relevant coordinate dimensions.

FIG. 4 is a detailed schematic view of the first exemplary embodiment of a position sensor arrangement 200 shown in FIG. 2, viewed along the direction of the minor axes of two elliptical structured light images according to this invention. Various relevant coordinate dimensions are shown. The various elements in FIG. 4 appear according to their projections along the viewing direction, to the plane of the figure. The approximate positions of various elements normal to the plane of the figure are indicated in FIG. 5. In FIG. 4 and the following description, the designators "2XX," "5XX," etc., include a generic portion "XX" to emphasize the generality of the following description and equations. It is intended that the generic "XX" may be interpreted to correspond to any appropriate particular instance of a target source, and its corresponding particular dimension, or coordinate, or the like. For example, the generic designators 2XX, 2XX', and $Z_{2XX}$ in FIG. 4 may be interpreted to correspond to particular elements 218, 218' and coordinate dimension $Z_{218}$, which in turn correspond to the particular "216" elements shown in FIG. 5, e.g., elements 218', $(x,y)_{218'}$, etc. Alternatively, the generic designators 2XX, 2XX', and $Z_{2XX}$ in FIG. 4 may be interpreted to correspond to particular elements 216, 216' and coordinate dimension $Z_{216}$, which in turn correspond to the particular "216" elements shown in FIG. 5, e.g., elements 216', $(x,y)_{216'}$, etc. As shown in FIG. 4, the target member 210 is rotated about an axis parallel to the direction of the minor axes of the elliptical structured light images. Reference numbers in common with FIG. 2 denote substantially similar elements. Thus, such elements will be understood from the description of FIG. 2, and only certain additional coordinate relationships and elements not shown in FIG. 2, are described here.

FIG. 4 shows that the collimated light 240 may be provided by a collimated light source arrangement 280 that is fixed in relation to the target member 210, by a schematically shown member (or members) 287. Thus, the direction of the collimated light 240 is maintained relative to the target member 210, despite rotation of the target member 210.

One procedure for determining the (x,y,z) coordinates of various target source vertices 215', 216', etc., is now described with reference to FIGS. 4 and 5. As described previously, by determining the minor axis dimension of an elliptical structured light image, the z-coordinate for the target source vertex corresponding to that image may be closely estimated, using EQUATION 1. We assume here that the z-coordinates $Z_{215}$ and $Z_{218}$ have been so determined. Next, in various exemplary embodiments according to this invention, it is convenient to determine the previously described tilt about an axis parallel to the direction of the minor axes of the elliptical structured light images, which is shown in FIG. 4 by a relative rotation angle φ. Using the target source vertex 215' and another target source vertex 218' in the same image detector image, the rotation angle φ is equal to:

$$\phi = \sin^{-1}\left(\frac{\Delta Z}{S_{major}}\right) \quad \text{(Eq. 2)}$$

where $\alpha Z=(Z_{215}-Z_{218})$ and the projection dimension $S_{major}$ is best understood with reference to FIGS. 4 and 5. The projection dimension $S_{major}$ is the distance between the target source vertices 215' and 218' along the direction on the light source plane 245 that is aligned with the direction of the major axes of the elliptical structured light images, when viewed along the z-axis.

In general, as best shown in FIG. 5, the projection dimension $S_{major}$ depends on the rotation about the z-axis of the direction of the major axes (or minor axes) of the elliptical images, relative to the directions of the $x_{tm}$ axis and/or the $Y_{tm}$ axis, which are the same for the target member and the light point plane. Various known dimensions between target source vertices on the light point plane can be used to estimate a rotation angle that is, in turn, usable to estimate the projection dimension $S_{major}$. One example is shown in FIG. 5 and described below.

FIG. 5 shows an illustration of a portion of an image detector image 500 on an image detector 230. It should be appreciated that in various exemplary embodiments according to this invention, the dimensions of the image detector 230 extend beyond those shown schematically in FIG. 5. Thus, in general, such embodiments are able to simultaneously image a greater number of elliptical structured light images than are shown in FIG. 5. Accordingly, methods analogous to those described below may be applied to a larger number of elliptical structured light images, or to a set of elliptical structured light images that are spaced apart by a number of pitch increments (instead of the exemplary single pitch increment spacing described below), and such methods may provide superior reliability and/or accuracy compared to the exemplary methods described below.

The image detector image 500 includes four elliptical structured light images 515, 516, 517 and 518, arranged to correspond approximately to the structured light target member and position sensor arrangement 200 shown in FIG. 4, along with various relevant coordinate dimensions. Each structured light image 5XX corresponds to the similarly numbered target source vertices 2XX'. Assuming that, based on the pixel data of the image 500, a respective best-fit ellipse has been analytically determined for each respective elliptical structured light image 5XX, each structured light image 5XX is completely characterized in terms of the image detector coordinate system. For example, the center of each ellipse $(p,q)_{5XX}$, the minor axis dimension $B_{5XX}$, the major axis dimension $A_{5XX}$, and the angle θ between the direction of the major axes and the x-axis of the image detector coordinates is also known. Accordingly, the coordinates of all points on each ellipse can be determined according to known methods, as needed. The image detector coordinates $(x,y)_{2XX'}$ of each target source vertex 2XX' are to be determined eventually, as outlined further below.

In the example shown in FIG. 5, to estimate a rotation about the z-axis of the direction of the major axes (or minor axes) of the elliptical images, relative to the directions of the $x_{tm}$ axis and/or the $y_{tm}$ axis, a rotation angle represented by β in FIG. 5 is estimated. As explained further below, the angle β estimated below is actually for an angle lying in the light point plane 245. However, the projected view along the z-axis direction in FIG. 5 is also labeled β, for simplicity. The angle β is estimated based on a dimension $L_{minor}$, that can be determined along the known direction of the minor axes in the image 500. The direction along the minor axis is chosen because the x-y plane of the image detector coordinate system is not tilted relative to the light point plane along this direction, thus, dimensions between image features along this direction are exactly the same as the dimensions between corresponding features on the light point plane along this direction.

Accordingly, the dimension $L_{minor}$ is determined between the known (or determinable) locations of the major axes of the elliptical structured light images (also referred to as ellipses) 516 and 518, along the known direction of the minor axes, according to known geometric methods. Since there is no tilt along the minor axis direction, as illustrated in FIG. 5, each target source vertex 2XX' is located along the line of symmetry that coincides with the major axis and the known center of the ellipse 5XX. Therefore the determined dimension $L_{minor}$ is between the major axes of the ellipses 516 and 518, and is the same as the dimension between the target source vertices 216, and 218, along the minor axis direction. It is observable from the relationship between the ellipses 515-518 in the image 500, that the ellipses 516 and 518 arise from target source vertices that are diagonal nearest-neighbors in a two dimensional array such as that described with reference to FIGS. 3A-3F. For this example, we assume the array has the same pitch P along each axis of the array. Thus, we can compare the determined dimension $L_{minor}$ to the known nearest-neighbor diagonal dimension, that is, P/(tan 45 degrees), represented by the line 590 in FIG. 5, to estimate the rotation angle β. Specifically, in this example:

$$\beta = \cos^{-1}\left(\frac{L_{minor}}{(P/\tan 45)}\right) \quad \text{(Eq. 3)}$$

It should be appreciated that the dimension Lminor is an accurate dimension in the light point plane 245, because it is along the "untilted" minor axis direction in the image. Also, (P/tan 45) is an accurate known dimension in the light point plane 245. Thus, the angle β is in the light point plane 245.

If the rotation angle β was zero, then the dimension $S_{major}$ shown in FIG. 4 would simply be P*sin(45 degrees). However, more generally, for the embodiment of the target source array on the target member 210 indicated in this description, the dimension $S_{major}$ is:

$$S_{major}=P*sin(45+\beta) \quad \text{(Eq. 4)}$$

With reference to FIG. 4, we can now determine the relative rotation angle φ as follows. The dimension Δz shown in FIG. 4 is $\Delta z=Z_{215}-Z_{218}$, therefore the relative rotation angle φ may be determined as:

$$\phi = \sin^{-1}\left(\frac{\Delta z}{S_{major}}\right) = \sin^{-1}\left(\frac{Z_{215}-Z_{218}}{S_{major}}\right) \quad \text{(Eq. 5)}$$

Furthermore, as may be seen in FIG. 4, using the known cone angle α, the known dimension $Z_{215}$ and the determined relative rotation angle φ, the dimension $E1_{215}$ between the point $P_{A1}$ and the vertex 215', along the major axis of the ellipse 515 in the image 500, can be determined from the following general expression (with 2XX=215):

$$E1_{2XX}=Z_{2XX}*\tan(\alpha+\phi) \quad \text{(Eq. 6)}$$

Thus, based on the determined dimension $E1_{215}$ along the known direction of the major axis relative to the known (or determinable) image detector coordinates of the point $P_{A1}$ on the ellipse 515 in the image 500, the (x,y) coordinates of the target source vertex 215' can be determined in the image detector coordinate system, according to known geometric methods. In combination with the previously determined z-coordinate $Z_{215}$, the 3-dimensional (x,y,z) coordinates of the target source vertex 215' are fully determined.

As previously outlined, if the target source vertex 215' is translated ΔX along the x-axis or ΔY along y-axis parallel to the image detector coordinate system reference plane 224, the location of the center of the image of the ellipse 515 will translate along corresponding directions on the image detector 230. Such translations can be determined between any two successive measurement images, and accumulated over a succession of such images, as described further below. Accordingly, a position sensor arrangement according to this invention is capable of measuring the z-coordinate of the target source vertex 215' in an absolute manner within any single image, and as well as initial (x,y) coordinates and accumulated relative X-Y motion thereafter. Accordingly, a position sensor arrangement according to this invention can determine the position of a target source vertex, such as the target source vertex 215', along 3 translational degrees of freedom, generally denoted as X, Y, and Z degrees of freedom herein, between a target point 215' and the position sensor arrangement.

The 3-dimensional (x,y,z) coordinates of other target sources vertices, such as the vertices 216'-218', may also be determined as described above. Based on the determined (x,y,z) positions of two target source vertices, such as the vertices 215' and 218', and their known spacing relative to one another on the light plane 245, the angular orientation of the light point plane 245 along a line connecting the vertices 215' and 218' can be determined in two planes, according to known methods. Thus, a position sensing arrangement according to this invention is capable of measuring a position relative to a target member along 3 translational degrees of freedom such as X, Y, Z and at least one angular or rotational degree of freedom, for a target member including at least two target sources having two corresponding target source vertices.

Of course, with at least three target source vertices that have known (x,y,z) coordinate positions, the orientation of the light source plane 245 (and an associated target member) is completely defined. Thus, a position sensing arrangement according to this invention is capable of measuring the relative position between a position sensor having an image detector, such as the image detector 230 and a structured light target member, such as the target member 210, including 3 translational degrees of freedom such as X, Y, Z and three angular or rotational degrees of freedom.

In various exemplary embodiments a signal processing unit inputs and analyzes successive structured light images arising from the target member 210 at a desired repetition rate or frame rate, in order to track accumulated motion of the target member 210, including motions that displace the target member 210 beyond one pitch increment and/or beyond one "field of view" increment along either or both directions of a two dimensional array of target sources arranged on the target member 210. In such a case, the known pitch or spacing of the target elements on the target member 210 provides a scale usable to accurately determine the total relative displacement between a position sensor according to this invention and the target member 210.

One method of tracking accumulated motion along directions that lie in the image detector coordinate system reference plane 224 is an image correlation method. Various applicable correlation methods are disclosed in U.S. Pat. No. 6,642,506 to Nahum, and U.S. patent application Ser. Nos. 09/987,162, 09/987,986, 09/860,636, 09/921,889, 09/731,671, and 09/921,711, which are incorporated herein by reference in their entirety.

It should be appreciated that a position sensing arrangement according to this invention may be designed or optimized to determine a desired range of positions along the z-axis direction of the image detector coordinate system. Of course the Z-range cannot extend beyond the position where the image detector of the position sensor reaches the plane of the target source vertices. This defines $Z_{minimum}$ of the Z-range in various exemplary embodiments. In various exemplary embodiments, the signal processing related to analyzing the structured light target images to determine their respective (x,y,z) coordinates is simplified if the images of the various target elements do not overlap on the detector array 230. Thus, in such embodiments the minimum spacing or pitch of the target sources on the target member 210 is chosen in light of the desired $Z_{maximum}$ of the Z-range and the operable cone angle α, according to the relation:

$$\text{minimum target source spacing} > 2*Z_{maximum}*\tan \alpha \quad \text{(Eq. 7)}$$

In various other exemplary embodiments, a minimum spacing is less than a value satisfying this relation and more complicated image processing is used to determine the Z-coordinates of the various target source vertices even though their respective structured light images overlap in the image detected by the image detector 230.

In one exemplary embodiment, the cone angle α is approximately 15 degrees, the target sources have a diameter of approximately 100 μm, and are spaced apart by a pitch of 1.0 mm along two orthogonal axes on the target member 210. The imaging array of the image detector 230 is approximately 4.7 mm by 3.5 mm, and includes 640 columns and 480 rows of pixels arranged at a pitch of approximately 7.4 μm along the orthogonal row and column directions. The nominal operating separation from the imaging array of the image detector 230 to the light source plane 245 defined by the target source vertices is approximately 1.0 mm +/−0.5 mm. With suitable image processing, as outlined further below, such a configuration can provide a resolution and accuracy of approximately 1-8 μm for X, Y and Z translations, and approximately 0.05 degrees for roll, pitch and yaw angles. Using a suitable array detector and DSP, 6D measurements can be provided at sample rates of up to 1000 Hz or more, in various exemplary embodiments.

As best seen in FIG. 5, the "image line" that forms any one of the previously described ellipses, has a nominal width along the radial direction of the ellipse. In various exemplary embodiments according to this invention, the nominal width of the elliptical image line in a particular elliptical image is determined by the design of the corresponding target source and the magnitude of the corresponding z-coordinate. It should be appreciated that the overall accuracy of a position sensor arrangement according to this invention, depends at least partly on the resolution with which the location of each portion of the "image line" that forms the previously described ellipse, or the like, can be determined. Thus, in various exemplary embodiments according to this invention, the nominal location of each portion of an "image line" is determined, fitted, or otherwise estimated with sub-pixel resolution, as described further below. Thus, in various exemplary embodiments, a position sensor arrangement according to this invention is designed such that the nominal width of the image line spans at least three pixels on the image detector 230, in order to facilitate sub-pixel interpolation for locating various image features. In various other exemplary embodiments that provide higher accuracy, the nominal width spans at fewest 3 and at most 6 pixels of the array detector 230. In other exemplary embodiments that sacrifice some accuracy and/or image processing simplicity in order to use more economical components, the nominal width spans less than three pixels or more than 6 pixels.

It should be appreciated that the parameters and elements of the foregoing specific exemplary embodiments are illustrative only, and not limiting. Numerous other operable embodiments are possible, and will be apparent to one of ordinary skill in the art, having the benefit of this disclosure.

As previously indicated, in various exemplary embodiments, at least three structured light images, such as the ellipses 515-518, fall within the field of view of the image detector 230 at all times. Thus, based on the (x,y,z) coordinates of the respective target source vertices corresponding to the respective structured light images, a unit vector that is normal to the light point plane 245 and the target member 210, or the like, can be found from three such target source vertices that lie on the light point plane 245. The cross-product of two vectors defined by the positions of three such target source vertices produces a vector perpendicular to the target surface, which can be used to determine various relative rotation components according to various well known methods of vector algebra and/or as outlined below.

Figure 6:
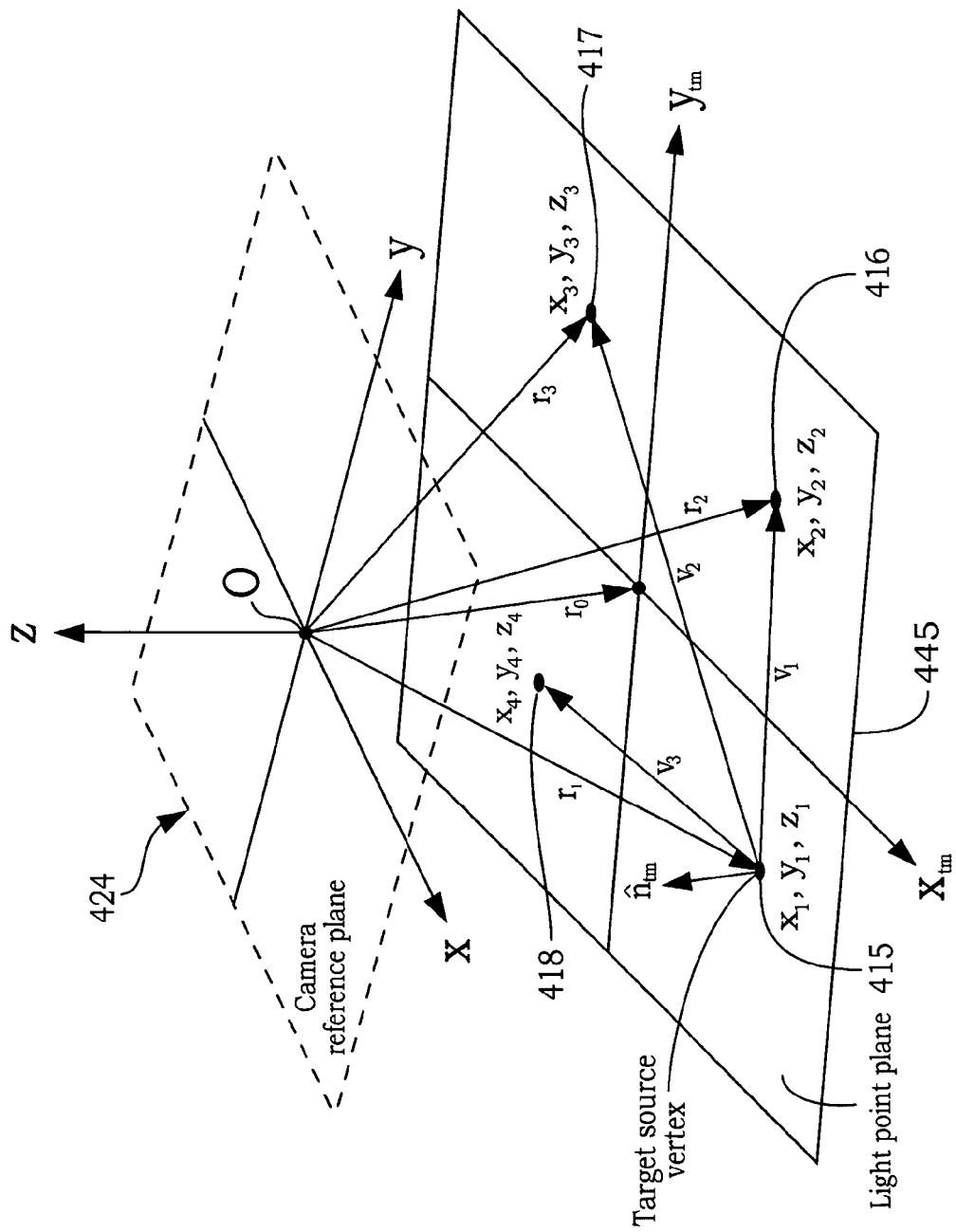
FIG. 6 is a diagram illustrating a reference plane of a position sensor according to this invention, and a light-point plane associated with a target member, and a first exemplary set of various related position vectors.

As shown in FIG. 6, the vectors $r_i$ connect the coordinate origin O on a image detector coordinate system reference plane 424, (also referred to as an image detector reference plane 424) to the target source vertices 415-417 on the light point plane 445. The vectors $v_i$ lie in the light point plane 445. The vector $r_0$ is defined as a vector normal to the light point plane 445 that runs through the coordinate origin O. A unit vector $n_{tm}$ that is normal to the light point plane 445 is constructed from the cross-product of two vectors $v_i$ that lie in the light point plane 445. For the example shown in FIG. 6:

$$\hat{n}_{tm} = \frac{v_1 \times v_2}{|v_1 \times v_2|}; \text{ where } v_i = r_{i+1} - r_1 \quad \text{(Eq. 8)}$$

It should be appreciated that the unit vector $n_{tm}$ in EQUATION 8 describes the tilt of the light point plane 445 (and the associated target member) relative to the z-axis defined by the direction normal to the image detector coordinate system reference plane 424, which can be used to determine the relative angular orientation of light point plane 445 (and the associated target member) and a position sensor according to this invention, about two orthogonal reference axes, according to known methods of vector algebra.

The $x_{tm}$- and $y_{tm}$-directions of the local x and y reference axes of the target member (and the associated light point plane 445) may be defined to coincide with a pattern of target sources arranged periodically along orthogonal axes on the target member, and/or the corresponding target sources vertices on the light point plane 445. For example, in various exemplary embodiments, the target source vertices are arranged in a periodic row and column pattern having a distance between the target source vertices in the $x_{tm}$-direction and $y_{tm}$-direction equal to the same periodic pitch P (that is, Px=Py=P). In various exemplary embodiments, the initial orientation of the $x_{tm}$-direction and $y_{tm}$-direction about the z-axis is known, and the relative rotation of the target member and light point plane 445 about the z-axis is limited to less than +/−45 degrees (or somewhat less, considering the possible effects of tilt about the x and y axes), or is tracked by a process that accumulates the net rotation about the z-axis over time. Thus, the approximate directions of the $x_{tm}$ and $y_{tm}$ axes about the z-axis are unambiguous. Accordingly, to define vectors along the $x_{tm}$- or $y_{tm}$-directions (assuming that tilt relative to the x and y axes is relatively limited, as is the case for most or all practical applications), in the worst case it suffices to start from the coordinates of a selected target source vertex, for example the target source vertex closest to the coordinate origin O, and identify 2 target source vertices that are closest to that one, and to each other. When the relative rotation in the X-Y plane between the target member (and/or light point plane 445) and a position sensor including an image detector, such as the image detector 230 for example, is limited to less than +/−45 degrees, or tracked, the direction of the respective vectors connecting the initially selected target source vertex with these two target source vertices will clearly identify the $x_{tm}$-direction and the $y_{tm}$-direction. For increased angular accuracy, longer vectors to target source vertices farther along these directions may be determined.

Thus, in various exemplary embodiments, defining either of the vectors described above as v (vectors v1 or v3 in FIG. 6), unit vectors that correspond to the $x_{tm}$-direction and $y_{tm}$-directions are:

$$\hat{x}_{tm} = \frac{v}{|v|} \left( \text{or } \hat{y}_{tm} = \frac{v}{|v|} \right) \quad \text{(Eq. 9)}$$

The unit vector along the $z_{tm}$-direction is the same as the unit vector $n_{tm}$ given by EQUATION 8, or is alternatively found from the cross-product:

$$\hat{z}_{tm} = \hat{x}_{tm} \times \hat{y}_{tm} \quad \text{(Eq. 10)}$$

In various exemplary embodiments, in order to determine relative orientation and fully define a 6D measurement of relative position and orientation, a rotation matrix R is formed from the unit vectors according to well know methods of vector algebra:

$$R = \begin{pmatrix} \hat{x}_{tm} \\ \hat{y}_{tm} \\ \hat{z}_{tm} \end{pmatrix} = \begin{pmatrix} x_{tm,x} & y_{tm,x} & z_{tm,x} \\ x_{tm,y} & y_{tm,y} & z_{tm,y} \\ x_{tm,z} & y_{tm,z} & z_{tm,z} \end{pmatrix} \quad \text{(Eq. 11)}$$

where the component $x_{tm,x}$ of the unit vector $x_{tm}$ component is along the image detector coordinate system x-axis, and so on for the other subscripted vector components. The rotation matrix is also described by roll, pitch, and yaw rotations applied to the target member in the image detector coordinate system, according to known methods of vector algebra. Here it is assumed that the rotations are applied in the following sequence: first roll ($\theta_r$, about the x-axis), then pitch ($\theta_p$ about the y-axis), then yaw ($\theta_y$, about the z-axis).

$$R = \begin{pmatrix} \cos\theta_y\cos\theta_p & \cos\theta_y\sin\theta_p\sin\theta_r + \sin\theta_y\cos\theta_r & -\cos\theta_y\sin\theta_p\cos\theta_r + \sin\theta_y\sin\theta_r \\ -\sin\theta_y\cos\theta_p & \cos\theta_y\cos\theta_r - \sin\theta_y\sin\theta_p\sin\theta_r & \cos\theta_y\sin\theta_r + \sin\theta_y\sin\theta_p\cos\theta_r \\ \sin\theta_p & -\cos\theta_p\sin\theta_r & \cos\theta_p\cos\theta_r \end{pmatrix} \quad (\text{Eq. 12})$$

The various rotation angles can be found by equating the two matrices.

$$\theta_p = \theta_{pitch} = \sin^{-1}(x_{tm,z}) \quad (\text{Eq. 13})$$

$$\theta_r = \theta_{roll} = \sin^{-1}(y_{tm,z}/\cos(\theta_{pitch})) \quad (\text{Eq. 14})$$

$$\theta_y = \theta_{yaw} = \sin^{-1}(x_{tm,y}/\cos(\theta_{pitch})) \quad (\text{Eq. 15})$$

Alternatively, the rotation of the position sensor relative to the various axes $x_{tm}$, $y_{tm}$, and $z_{tm}$ of the target member may be determined by analogous methods of vector algebra or by known vector algebra transformations of the results indicated above.

Figure 7:
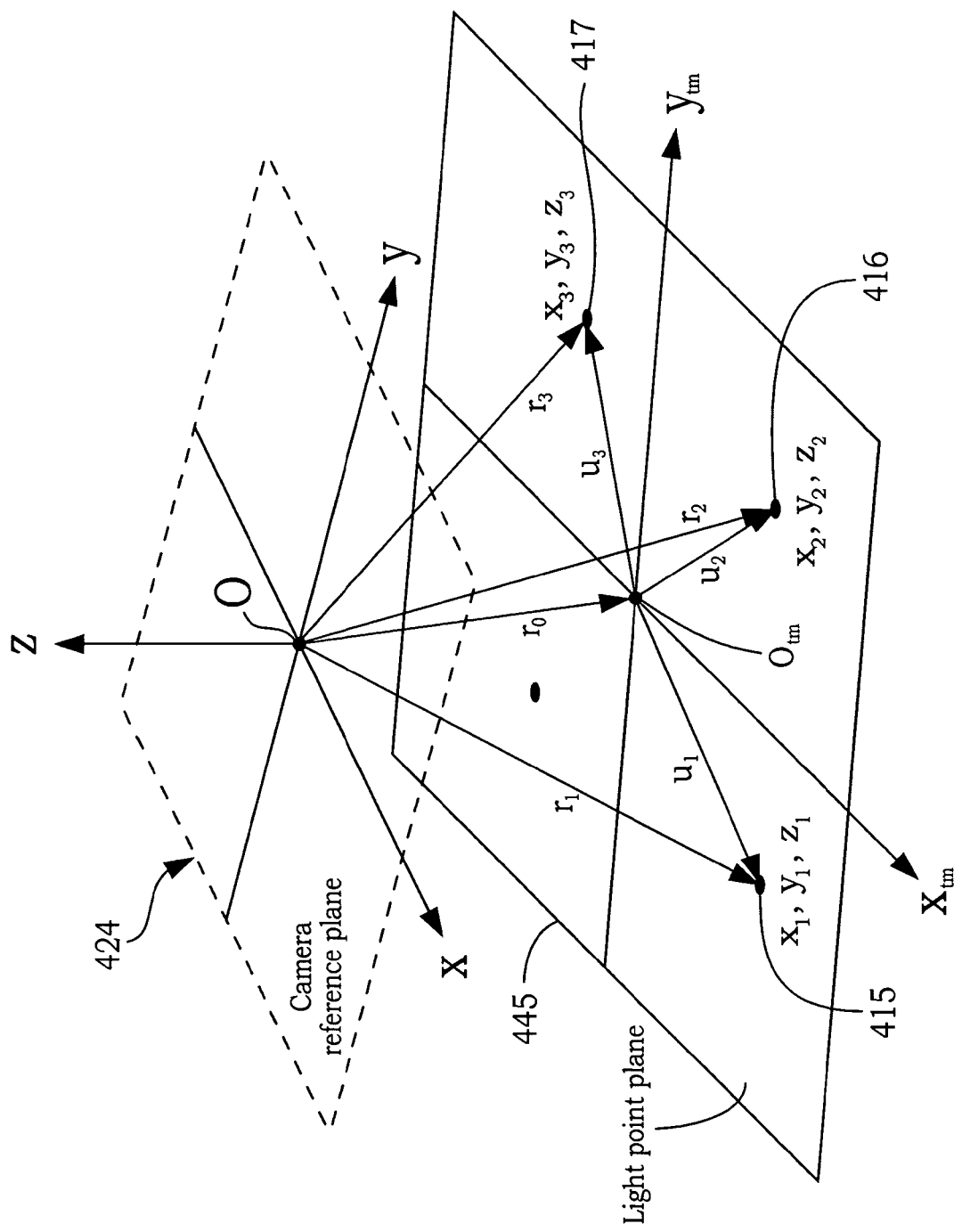
FIG. 7 is a diagram illustrating the reference plane and the light-point plane shown in FIG. 6, and a second exemplary set of various related position vectors.

In various exemplary embodiments, the translational position of the position sensor compared to the target member may be determined as follows: The point $O_{tm}$ shown in FIG. 7 is defined as the current origin of the local axes of the target member. A vector that is parallel to the light point plane normal $n_{tm}$, or to $Z_{tm}$, between the origin O and a point that lies on the light point plane 445 defines the point $O_{tm}$. As shown in FIG. 7, this is the vector $r_0$, aligned along the $Z_{tm}$ axis of the light point plane 445 and connecting the two points (O and $O_{tm}$) The z-coordinate of the position sensor, or "effective gap" is defined as the length of the vector $r_0$. The current local $x_{tm}$- and $y_{tm}$-coordinates of the position sensor relative to the light point plane 445 (corresponding to an associated target member) will be referenced to the current light point plane origin point $O_{tm}$.

It should be appreciated that the 3 rotational components and the z-coordinate translational component or gap can be determined absolutely from any single target member image, as outlined above, using a position sensor arrangement according to this invention. However, it should be appreciated that the total displacements of the position sensor with respect to the light point plane 445 and/or target member along $x_{tm}$- and $y_{tm}$-directions are not absolute quantities, but must be determined by a process that includes tracking accumulated increments of the target source vertex pattern pitch along the $x_{tm}$- and $y_{tm}$-directions during relative $x_{tm}$- and $y_{tm}$-translation, by methods or algorithms that will be apparent to one of ordinary skill in the art. In addition, for accurate measurements, it is necessary to add to the accumulated $x_{tm}$- and $y_{tm}$-increments the initial position within the initial $x_{tm}$- and $y_{tm}$-periods of the target source vertex pattern, and the final position in the final $x_{tm}$- and $y_{tm}$-periods of the target source vertex pattern, in a manner analogous to well known methods used with 1D and 2D incremental optical encoders.

To determine a position within the current $x_{tm}$- and $y_{tm}$-periods of the target source vertex pattern, the point $O_{tm}$ is defined by the vector $r_0$, which is determined according to well known methods of vector algebra:

$$r_0 = \hat{z}_{tm} \cdot r_i \cdot \hat{z}_{tm} \quad (\text{Eq. 16})$$

where the vector $r_i$ can correspond to the known image detector-frame coordinates of a target source vertex, such as any of the target source vertices 415-417 shown in FIG. 7.

The gap or z-coordinate is equal to the length of $r_0$.

$$gap = |r_0| \quad (\text{Eq. 17})$$

At an initial position sensor position within any current $x_{tm}$- and $y_{tm}$-period, the position vector lying in the light point plane 445 between the position sensor $x_{tm}$- and $y_{tm}$-position, which coincides with point $O_{tm}$, and any one or more target source vertices associated with nearby ring-shaped structured light source images in the image detector image, may be determined as:

$$u_i = r_i - r_0 \quad (\text{Eq. 18})$$

To determine the coordinates of the position sensor in terms of the current target member coordinates:

$$x_i = u_i \cdot \hat{x}_{tm} \quad (\text{Eq. 19})$$

$$y_i = u_i \cdot \hat{y}_{tm} \quad (\text{Eq. 20})$$

where $x_i$ and $y_i$ are the current local displacements of the position sensor from the nearby target source vertex corresponding to the particular position vector $u_i$ used in EQUATIONS 19 and 20, along the current $x_{tm}$- and $y_{tm}$-axes.

As previously described, it is possible and necessary to track the accumulated increments of the $x_{tm}$- and $y_{tm}$-pitch of the target source vertex pattern between an initial or reference position and a current or final position. Thus, the accumulated increments between the reference target source vertex used for an initial position determined according to EQUATIONS 18-20, and the reference target source vertex used for a final position determined according to EQUATIONS 18-20, are known or can be determined. Thus, the current x-y position (that is, the accumulated x-y displacement) of the position sensor relative to the light point plane 445 and/or target member can be determined accordingly.

The foregoing procedures outline one exemplary set of procedures for determining the coordinates of various target source vertices, and the 6D relative position between a light point plane (and/or target member) and a position sensor according to this invention. It should be appreciated from the foregoing procedures that, more generally, given the determination of the coordinates of 3 target source vertices relative to a position sensor according to this invention, any 1D to 1D to 6D relative position measurement between the light point plane (and/or target member) and the position sensor according to this invention can be determined with reference to any coordinate frame that is appropriate or convenient for a particular measuring application. Any alternative mathematical method and/or signal processing may be used that is appropriate or convenient in a particular application.

For example, in various motion control applications, it may be convenient to roughly determine various accumulated displacements based on stepper motor control signals or the like. In such a case, yaw rotations and incremental target source vertex pattern pitch accumulations need not be restricted or tracked, and it may be sufficient to simply determine various current local positions as outlined above, in order to refine the rough displacement determinations based on the stepper motor control signals, or the like, to a higher accuracy level. Furthermore, it should be appreciated that for any particular image detector image, various combinations of target source vertices may be used to provide redundant measurements, which may be averaged to enhance the measurement accuracy in various exemplary embodiments according to this invention. Accordingly, the foregoing exemplary procedures are illustrative only, and not limiting.

Figure 8:
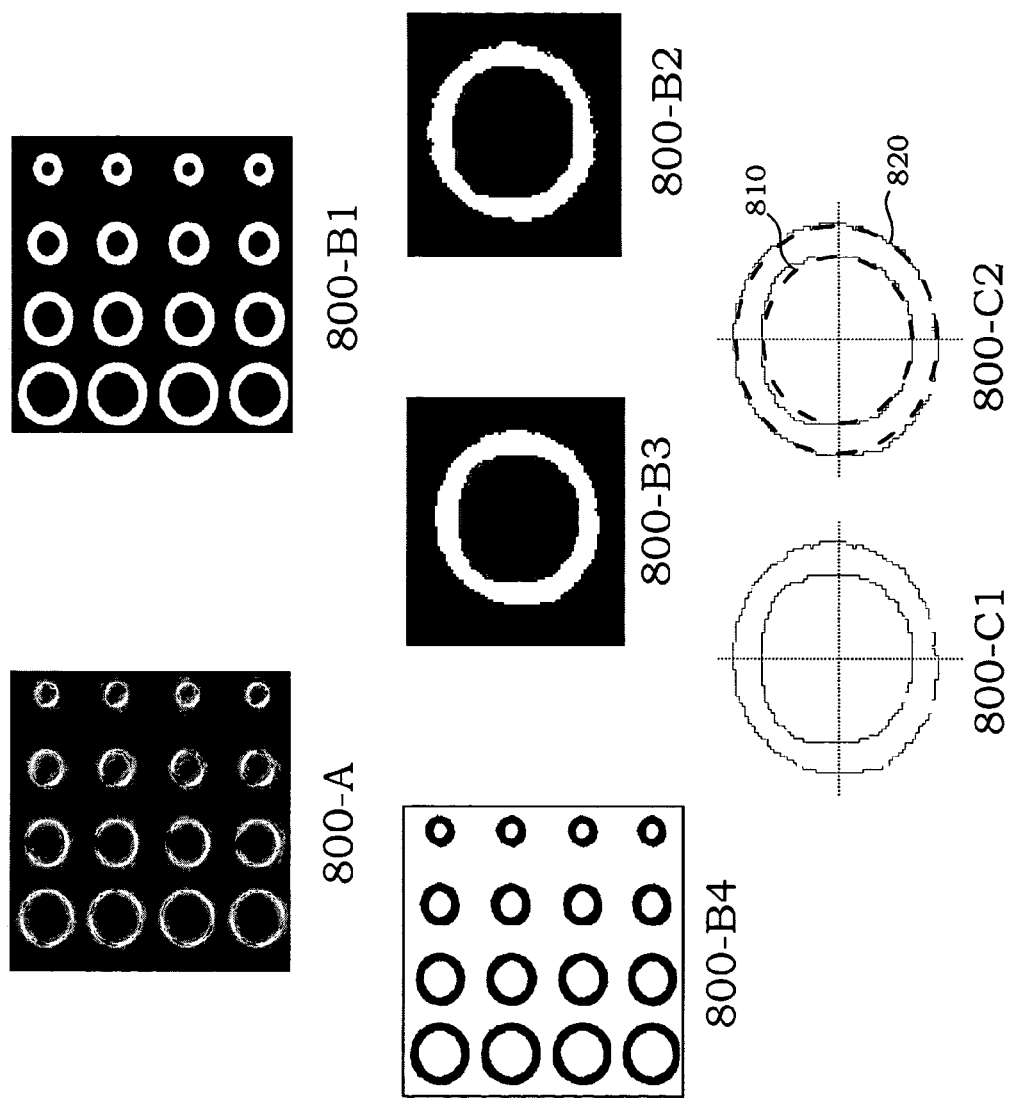
FIG. 8 depicts a representative image provided according to this invention, along with the results obtained from one exemplary set of image processing operations usable to identify various structured light image feature characteristics to be measured.

The previous discussions have not considered in detail the width, and the intensity variation radially across the width, of the lines that form the elliptical structured light image features in an image provided according to this invention. FIG. 8 depicts a representative image 800-A that is provided according to this invention. FIG. 8 also depicts results obtained from one exemplary set of image processing operations usable to identify various structured light image feature characteristics in a measurement image according to this invention, as demonstrated on the image 800-A.

The pseudo-image 800-B1 is produced by determining an intensity threshold, for example an intensity value between the peaks of a bimodal intensity distribution determined from the image 800-A, and assigning all pixels having intensities below the threshold a value of zero, and all other pixels a value of one. The pseudo-image 800-B2 shows a close-up of one of the ring-shaped features that results from applying a filter to smooth the boundaries in the pseudo-image 800-B1. For example the filter may comprise setting each pixel value to the value of the majority of its 8-connected neighbors. The pseudo-image 800-B3 shows a close-up of the ring-shaped feature of the pseudo-image 800-B3 that results from applying a further boundary smoothing operation. For example, the further smoothing operation may comprise a first dilation operation wherein each pixel is assigned the value corresponding to the maximum pixel value (1, for a binary image) in its 8-connected neighborhood, followed by a second erosion operation wherein each pixel is assigned the value corresponding to the minimum pixel value (0, for a binary image) in its 8-connected neighborhood.

The pseudo-image 800-B4 shows a pseudo-image of the result obtained by retaining only an approximately single-pixel-wide track at the inner and outer boundaries of all ring-shaped structured light image features processed similarly to the ring shown in the close-up view 800-B3. In one exemplary embodiment, a first connectivity analysis is performed to identify the pixels corresponding to each individual ring-shaped structured light image feature. For example, in one exemplary embodiment, starting a set from any one-valued pixel, each neighboring one-valued pixel is added to the set. Then each of the one-valued neighbors of each of the added pixels is added to the set, and so on, until there are no new one-valued neighbors to add. Then that set of pixels is labeled as an individual ring-shaped structured light image feature. The process is repeated until all desired ring-shaped features are identified and labeled. Each ring-shaped structured light image feature is "labeled" or identified so that the appropriate pixels are used for the fitting routine(s) to be applied later to each ring-shaped image feature, as described further below.

Next, in various embodiments, each labeled feature is processed to determine an approximately single-pixel-wide track at its inner and outer boundaries. For example, for a labeled feature, a subset of its one-valued pixels is identified corresponding to those pixels that have a neighbor that has a value of zero. Then, a connectivity analysis is performed on the subset. Two further subsets will result: The connected pixels forming a ring at the outer boundary of that labeled feature, and the connected pixels forming a ring at the inner boundary of that labeled feature. Such labeled subsets are shown in the pseudo-image 800-B4.

The pseudo-image 800-C1 shows a close-up of the circular tracks of one of the ring-shaped features in the pseudo-image 800-B4, and the pseudo-image 800-C2 shows best-fit dashed-line ellipses 810 and 820 fit to the elliptical tracks of the ring-shaped feature of the pseudo-image 800-C1. The elliptical tracks of each ring-shaped image feature in the pseudo-image 800-B4 may be similarly processed, using any now known or later developed ellipse fitting method. One exemplary ellipse fitting method that is usable in various embodiments according to this invention is described in "Image Fusion and Subpixel Parameter Estimation for Automated Optical Inspection of Electronic Components", by James M. Reed and Seth Hutchinson, in IEEE Transactions on Industrial Electronics, Vol. 43, No. 3, June 1996, pp. 346-354, which is incorporated herein by reference in its entirety. The ellipse fitting method described in the reference cited above can use the pixel data of the identified elliptical image features described above to provide values for the major and minor axis dimensions A, B, and the orientation angle θ (shown in FIG. 5, for example), as well as x and y center coordinates, which are referred to as the (p,q) center coordinates in FIG. 5.

In various exemplary embodiments according to this invention, the average of the minor axis dimensions of the inner and outer ellipses is used as the dimension d in EQUATION 1. More generally, each of the respective ellipse parameters characterizing the inner and outer ellipses are respectively averaged, and the average parameters are used to characterize the corresponding elliptical structured light image. For example, in addition to determining the z-coordinate, the averaged parameters are used to determine the coordinates of the point $P_{A1}$ (see FIG. 5), or the like, that is used along with the dimension $E1_{2XX}$ determined according to EQUATION 6, to determine the (x,y) coordinates of the corresponding target source vertex. Thus, in various exemplary embodiments the (x,y,z) coordinates of a target source vertex are determined using the corresponding fit ellipse(s) resulting from the operations described above with reference to FIG. 8, or the like.

In cases where N points are inscribed along a circle or ellipse (see FIG. 20 and the related description), the centroid of each point could be found by any one of several known methods, such as an intensity weighted "center of mass" type calculation for all pixels over a given threshold in intensity. Once the point locations are known, they can be fitted to an equation for an ellipse by standard fitting methods.

It should be appreciated that the image processing operations described above are illustrative only, and not limiting. Various operations may be eliminated, replaced by alternative operations, or performed in a different sequence, in various embodiments according to this invention.

It should be appreciated that while the foregoing image processing and coordinate determining operations are relatively fast, and provide sufficient accuracy for a number of applications, the image processing operations have suppressed a considerable amount of the information available in the original image of each ring shaped feature. It should be appreciated that the estimated coordinates of each target source vertex can be determined with higher accuracy, or refined, by making use of this suppressed information.

Figure 9:
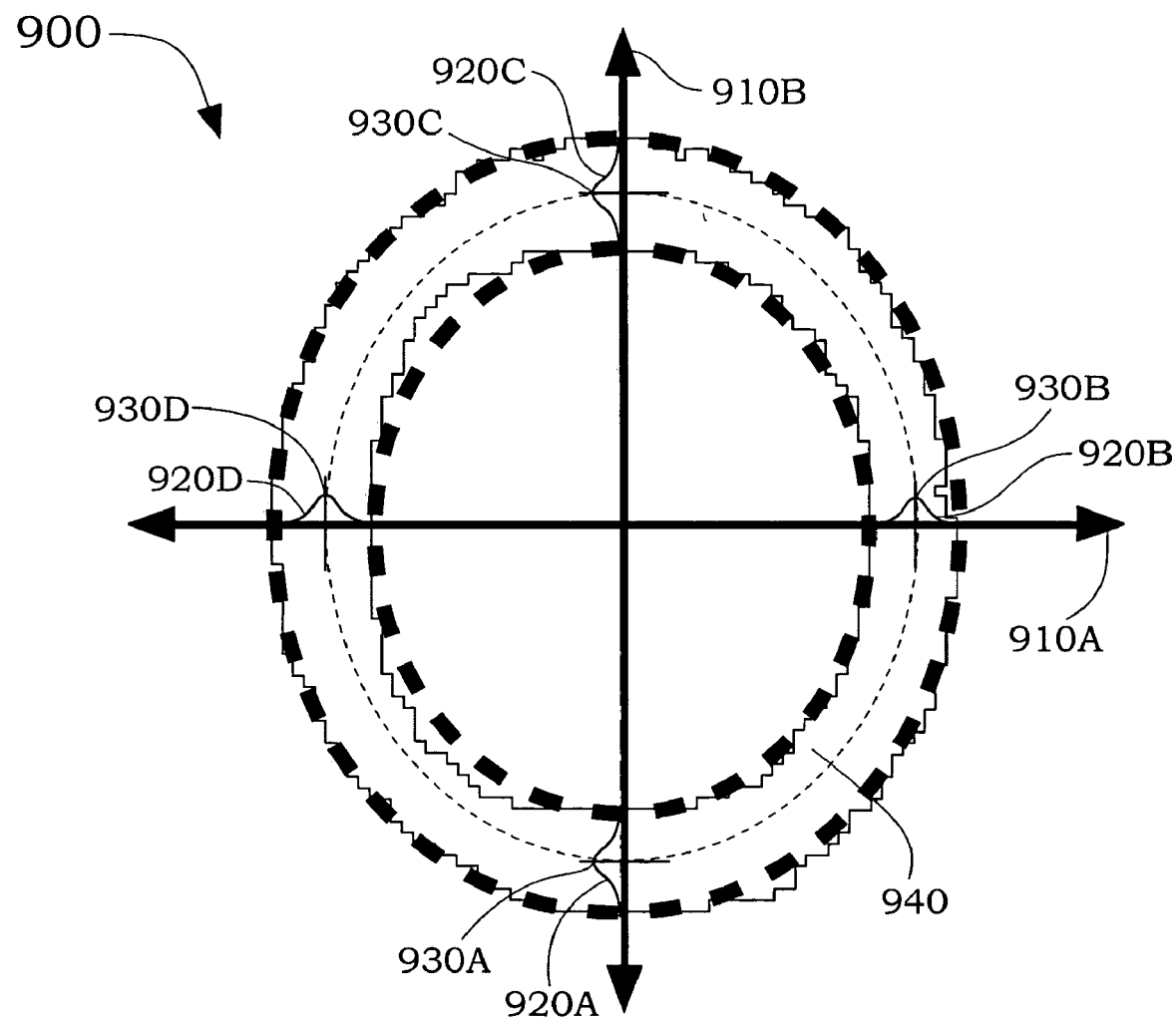
FIG. 9 shows an exemplary structured light image feature representation similar to a result shown in FIG. 8, along with a superimposed diagram clarifying a method of determining a refined estimate of the ellipse parameters used to determine the (x,y,z) coordinates of a corresponding target source.

FIG. 9 shows an illustration 900 of the best-fit ellipses 810 and 820 and the elliptical tracks of the image 800-C2 of FIG. 8, along with a superimposed diagram clarifying one exemplary method of determining a refined estimate of the parameters of an ellipse used to determine the (x,y,z) coordinates of a corresponding target source vertex in various exemplary embodiments according to this invention.

Briefly, at least two lines 910A and 910B are drawn through the averaged center of the best-fit ellipses 810 and 820, such that the lines are approximately evenly spaced over 360 degrees around the best-fit ellipses 810 and 820. It is desirable that two such lines are aligned along the estimated minor and major axes of the best-fit ellipses 810 and 820, particularly if only a few of the lines 910X are drawn. Next the respective sets of pixels that are closest to the respective lines 910A and 910B and that lie between the best-fit ellipses 810 and 820 are identified. For each respective set of pixels, the corresponding intensity values in the original target member image are determined, as indicated by the respective radially-oriented intensity profiles 920A-920D. Next, the respective pixels 930A-930D corresponding to the respective peaks of each of the radially-oriented intensity profiles 920A-920D are identified by any now known or later developed method. For example, in various embodiments a curve or a specific experimentally determined function is fit to the respective radially-oriented intensity profiles, the respective peaks of the set of curves or functions are determined according to known methods, and the corresponding set of respective pixels 930A-930D is identified. Next, a new best-fit ellipse is fit to the set of respective "peak pixels" 930A-930D according to any now known or later developed method that provides high accuracy, such as those that include outlier removal and the like. Next, the ellipse parameters of that new best fit ellipse are used to determine the (x,y,z) coordinates of the corresponding target source vertex, as previously described, in order to provide a more accurate refined estimate of the (x,y,z) coordinates of a target source vertex in various exemplary embodiments according to this invention. It will be appreciated that although FIG. 9, for simplicity, shows two lines that are used as the basis for defining 4 data points that are fit to a ellipse, a greater number of lines and associated data points will generally provide higher accuracy, and are therefore desirable in various exemplary embodiments according to this invention.

More generally, the methods and operations outlined above with respect to FIGS. 8 and 9 are illustrative only and not limiting. A variety of alternative image processing operations may be used to locate the elliptical image features and determine the desired target source vertex coordinates. Descriptions of the image processing operations outlined above, as well as numerous alternatives, may be found in image processing literature, for example in *Machine Vision*, by Ramesh Jain, et al., McGraw Hill, 1995, which is incorporated herein by reference in its entirety.

Figure 10:
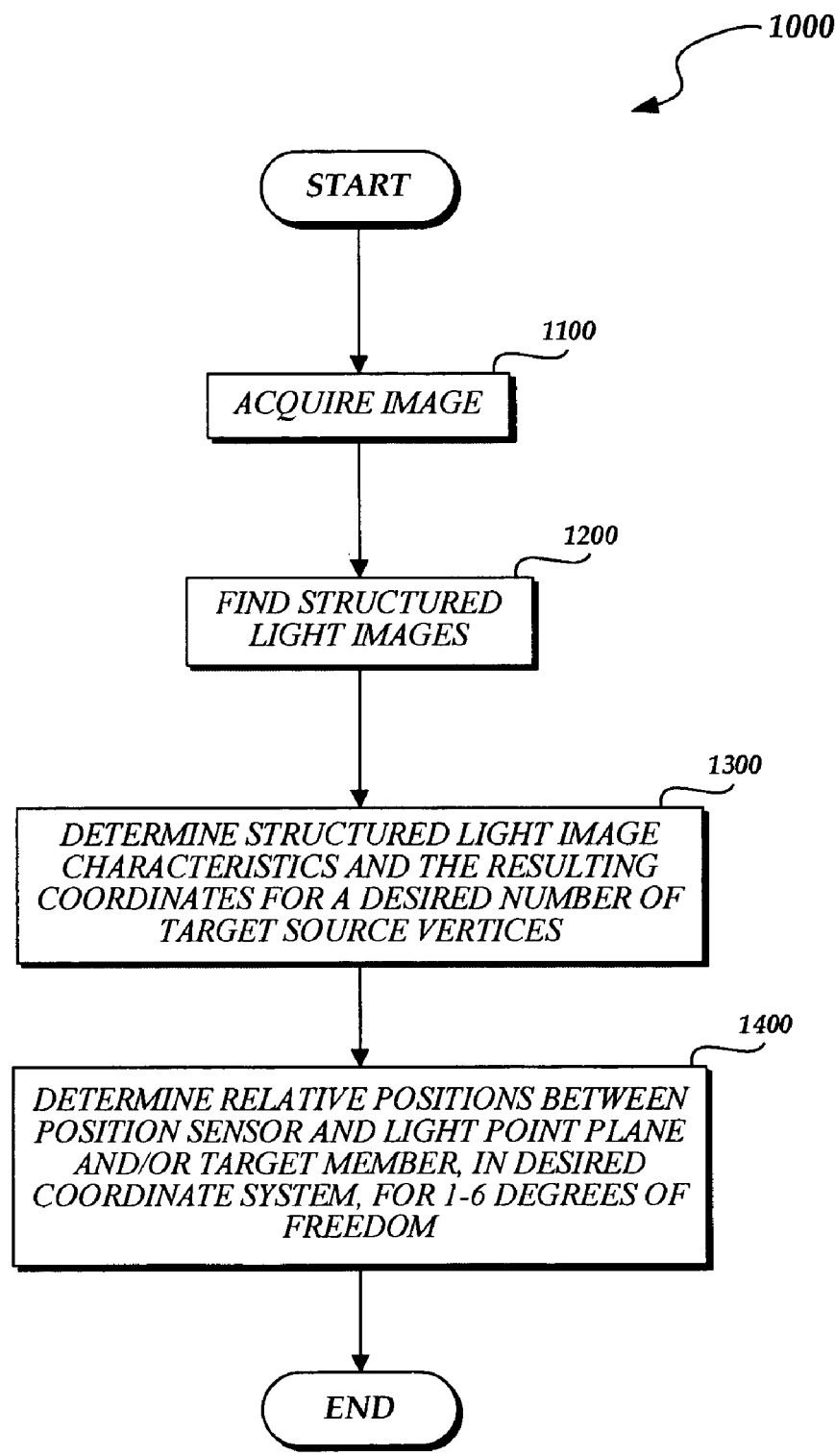
FIG. 10 is a flow diagram of a first exemplary algorithm, for determining a relative position measurement based on a structured light image provided according to this invention.

FIG. 10 is a flow diagram of a first exemplary algorithm 1000, for determining a relative position measurement between a position sensor and light point plane and/or target member based on an image provided according to this invention. The algorithm begins at a block 1100 with acquiring an image including a plurality of structured light image features. At a block 1200, operations are performed to find at least some of the plurality of structured light image features, such as the previously described elliptical image features, in the image acquired at the block 1100. Next, at a block 1300, operations are performed to determine the characteristics of the structured light images found at the block 1200, such as the previously described ellipse parameters, and to determine the resulting coordinates for a desired number of corresponding target source vertices. The algorithm continues to a block 1400, where operations are performed to determine the relative position between the position sensor and light point plane and/or target member for 1 to 6 degrees of freedom in a desired coordinate system, based on the target source vertex coordinates determined at the block 1300.

Figure 11:
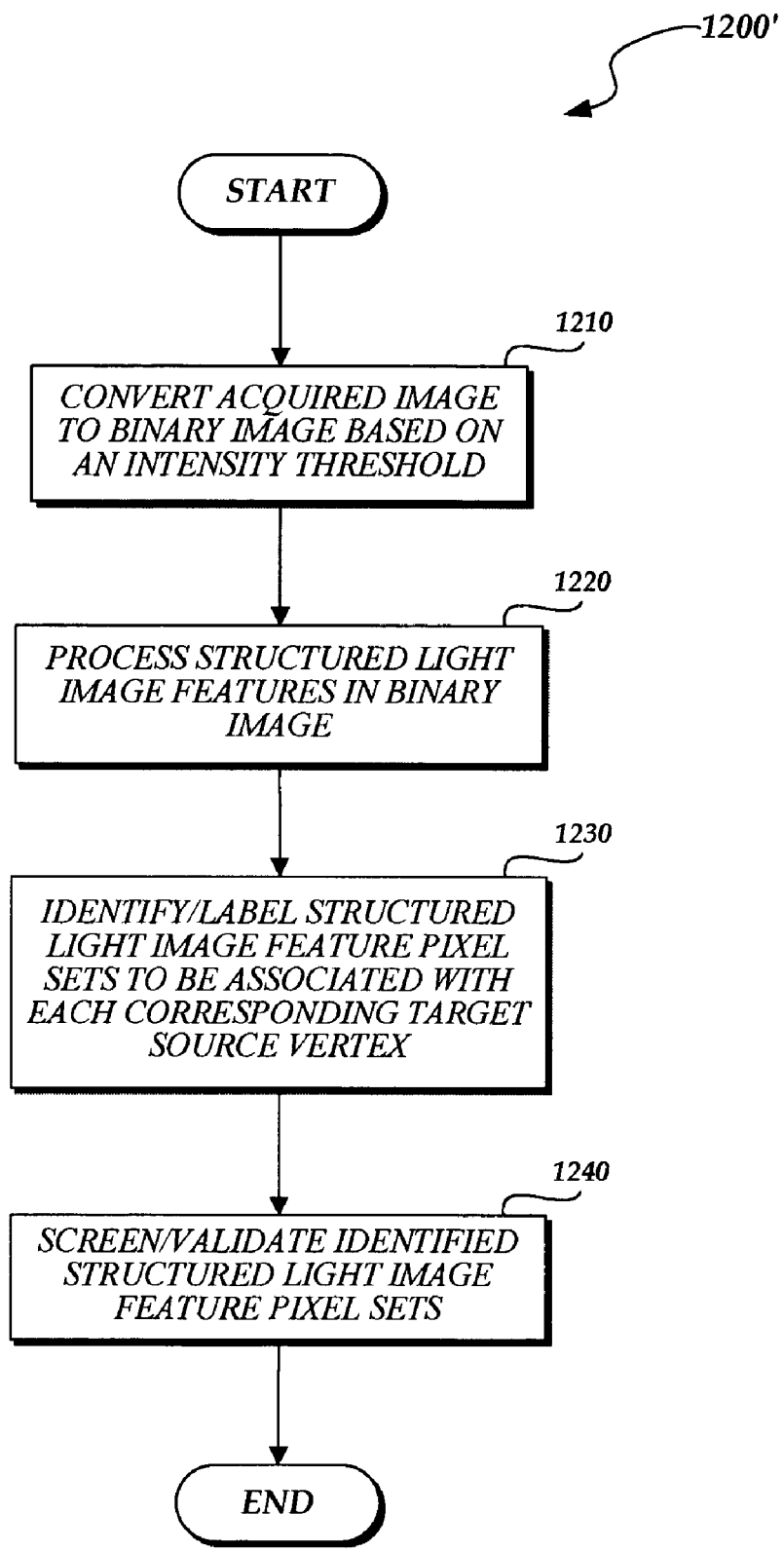
FIG. 11 is a flow diagram of a second exemplary algorithm, usable in the first exemplary algorithm, for identifying various structured light image feature characteristics in an image provided according to this invention.

FIG. 11 is a flow diagram of a second exemplary algorithm 1200', which is one exemplary embodiment usable for the operations of the block 1200 of the first exemplary algorithm, for identifying various structured light image feature characteristics in an image provided according to this invention. The algorithm begins at a block 1210 by converting an acquired image according to this invention to a binary-valued pseudo-image, based on a default or specifically determined intensity threshold. At a block 1220, image processing operations are performed to isolate or identify desired structured light image feature characteristics in the binary image. In one exemplary embodiment, the operations of the block 1220 apply one or more known image filtering operations to smooth the boundaries between the zero-valued (dark) pixels and the one-valued (light) pixels in the pseudo-image data and identifying pixels corresponding to two elliptical single-pixel-wide tracks at the smoothed boundaries. The two tracks are preferably either both all-dark or both all-light pixels. The two elliptical single-pixel-wide tracks provide structured light image feature pixel sets corresponding to elliptical structured light image feature characteristics that are associated with a corresponding target source vertex.

Next, at a block 1230, operations are performed to effectively identify or label the desired structured light image feature pixel sets that are to be associated with each corresponding target source vertex. Next, in various exemplary embodiments according to this invention, at a block 1240 operations are performed to screen or validate the structured light image feature pixel sets identified at block 1230, in order to eliminate pixel sets that pose a risk of providing degraded or invalid coordinates for a corresponding target source vertex. In various exemplary embodiments the operations of block 1240 may comprise one or more of a pixel connectivity test indicative of sufficiently well-defined target features, a pixel outlier test based on an expected shape to be exhibited by a valid set of pixels, a test based on the proximity of adjacent pixel sets (which may indicate a potential distortion due to the overlap or proximity of adjacent structured light image features near the ends of the measuring range in various exemplary embodiments), and/or any other now known or later developed test that serves the purpose of the block 1240. However, in various exemplary embodiments according to this invention where sufficiently reliable structured light image features and/or sufficiently accurate measurement results are otherwise insured, the operations of the block 1240 may be omitted.

Figure 12:
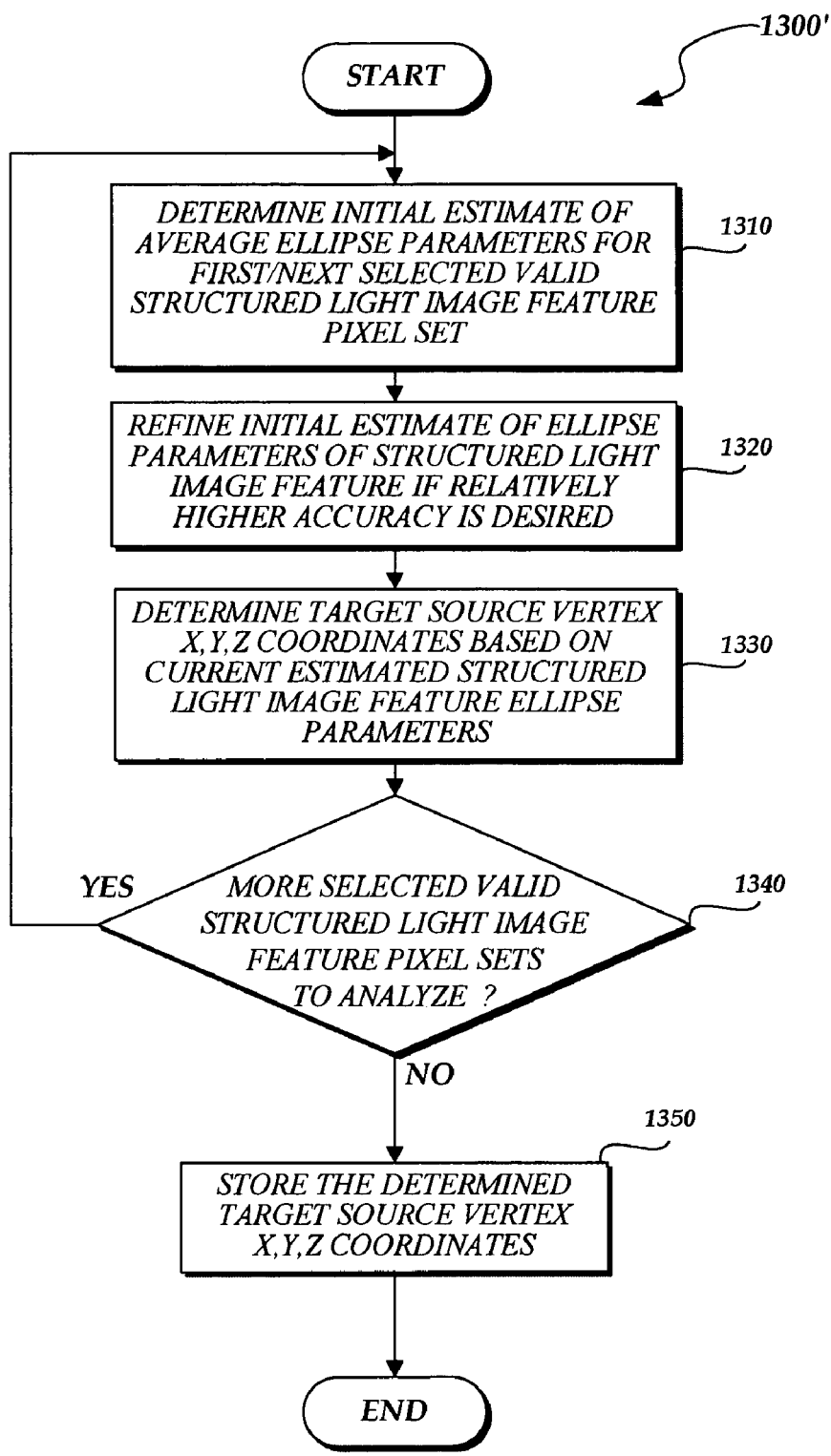
FIG. 12 is a flow diagram of a third exemplary algorithm, usable in the first exemplary algorithm, for determining the sizes and locations of various structured light image features in an image provided according to this invention, and the resulting target source coordinates.

FIG. 12 is a flow diagram of a third exemplary algorithm 1300', which is one exemplary embodiment usable for the operations of the block 1300 of the first exemplary algorithm, for determining the structured light image characteristics of various structured light image features in an image provided according to this invention, and the resulting coordinates for a desired number of corresponding target source vertices. The algorithm begins at a block 1310 by determining an initial estimate of the average ellipse parameters of a structured light image feature based on a first selected pixel set that is known or presumed to be a set of pixels usable to provide sufficiently accurate coordinates for a corresponding target source vertex. The average ellipse parameters of the structured light image feature may be determined according to any suitable now known or later developed method. In various exemplary embodiments, the selected valid pixel set is provided by the results of the algorithm 1200'. In one exemplary embodiment, the results of the algorithm 1200' provide two concentric elliptical single-pixel-wide tracks which characterize the structured light image feature and the parameters characterizing of the corresponding structured light image feature are determined based on the averaged parameters of best-fit ellipses that are fit to the two elliptical single-pixel-wide tracks according to any known method.

Next, in various exemplary embodiments, at a block 1320 operations are performed to refine the initial estimates of the ellipse parameters provided by the operation of the block 1310. The refined estimates are usable to determine the (x,y,z) coordinates of a corresponding target source vertex to a higher level of accuracy than that provided by the initial estimates. The refined estimates may be determined according to any suitable now known or later developed method.

In one exemplary embodiment, the operations of the block 1320 comprise determining a plurality of lines or vectors extending through the initially estimated ellipse center and past the extremities of the corresponding selected pixel set. The lines are evenly spaced over 360 degrees about the initially estimated ellipse center. It is preferable that two of the lines extend along the minor and major axes of the initially estimated ellipse. Next, operations are performed to identify respective sets of radially arranged pixel addresses that are closest to the respective lines, and that lie between the inner and outer boundaries corresponding to the structured light image feature in the corresponding selected pixel set. Next, for each respective set of radially arranged pixel addresses, the corresponding intensity values in the original image are determined. Next, the pixel addresses or image detector coordinates are determined that correspond to the respective nominal peak intensity locations for each of the respective sets of radially arranged pixel addresses. For example, in various embodiments a curve or a specific experimentally determined function is fit to the respective radially arranged intensity values, the respective peaks of the set of curves or functions are determined according to known methods, and the corresponding pixel addresses or image detector coordinates are determined. Next, a best-fit ellipse is fit to the set of respective "peak pixels" according to any now known or later developed method, and the resulting ellipse parameters constitute the refined estimate provided at the block 1320. When the operations of the block 1320 are completed, operation passes to the block 1330.

It should be appreciated that in various exemplary embodiments or applications of the algorithm 1300', the initial ellipse parameter estimates provided by the operations of the block 1310 are usable to identify the coordinates of the corresponding target source vertex with sufficient accuracy for that embodiment of application. In such cases, the operations of the block 1320 are omitted. In such cases, operation passes directly form the block 1310 to the block 1330.

At the block 1330, the (x,y,z) coordinates of the corresponding target source vertex are determined based on the current estimated target feature ellipse parameters, by any now known or later developed method. The methods previously described herein are used in various exemplary embodiments. Next at a decision block 1340, if there are more selected structured light image feature pixels set to analyze, the algorithm returns to operations at the block 1310. Otherwise, if there are no more selected structured light image feature pixels set to analyze, the algorithm continues to a block 1350, where operations are performed to store the all the target source vertex (x,y,z) coordinates previously determined by the algorithm 1300'.

Figure 13:
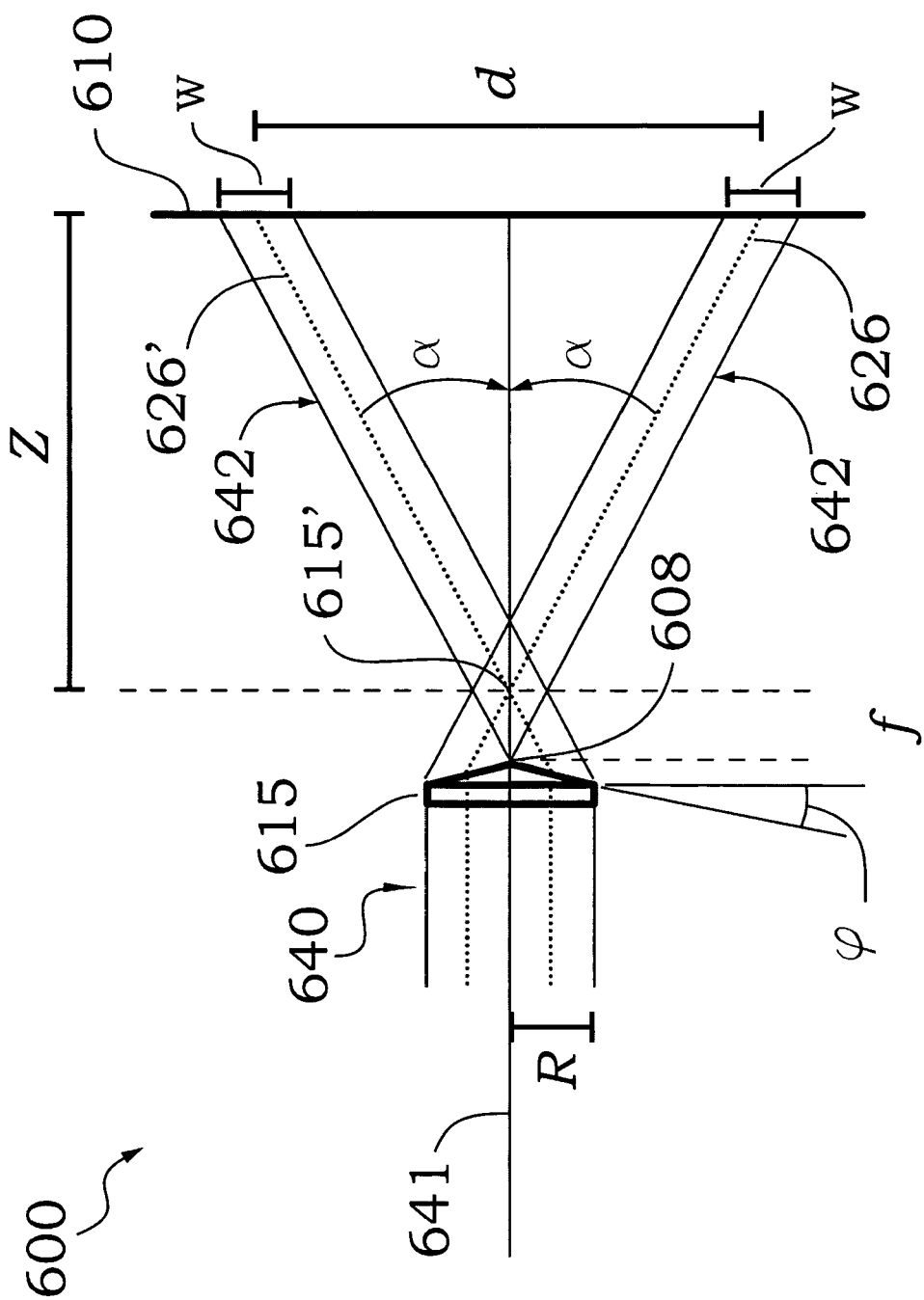
FIG. 13 depicts a first generic axicon lens target source configuration that is usable according to this invention, along with the resulting structured light pattern.

FIG. 13 shows a detailed schematic side view of an exemplary conical axicon lens target source configuration 600 and the resulting structured light pattern. The relationship between Z and d in FIG. 13 has been previously discussed and is given by EQUATION 1. The axicon lens 615 shown in FIG. 13 is cylindrically symmetrical about the optical axis 641 and the conical portion of the lens has a base angle φ. The conical portion of the lens causes the rays of an incident collimated beam 640 to refract towards the optical axis 641, according to a refraction angle α. The refraction angle α is designed or determined as follows:

$$\alpha = (n-1)\phi \quad \text{(Eq. 21)}$$

where f is the base angle and n is the index of refraction of the lens material. The refraction angle α is effectively the same as the cone angle α previously described herein.

The central rays 626 and 626' represent the nominal path of the wall(s) of the structured light cone 642, which has a nominal thickness or width that gives rise to a nominal image line thickness W in the structured light images arising from the light cone 642. In general, a position sensor arrangement according to this invention can be more accurate when the axicon lens 615 and collimated beam 640 are configured to produce an image line thickness W that is within a range to span approximately 3-6 pixels on an image detector of the position sensor arrangement. Such a range tends to define the image line location with high resolution, while also providing an image line that is wide enough to facilitate accurate image dimension measurement when using subpixel interpolation to estimate the image line's nominal (center) location with high resolution. However, both narrower and much wider nominal image line widths are also operable and, possibly, more robust or more economical in various applications of various exemplary embodiments according to this invention. As can be seen in FIG. 13, in various exemplary embodiments according to this invention, the image line width W is primarily controlled by the choice of the lens radius R and the cone angle (refraction angle) α. However, the cone angle α is generally constrained by other design considerations, so the lens radius becomes the primary means of controlling the image line width W in various embodiments. For ideally collimated light and a precise axicon lens, image line width W is approximately:

$$W = R^*(1 - \tan\phi \tan\alpha) \quad \text{(Eq. 22)}$$

As one design example, in one embodiment a cone angle of 20 degrees is to be provided using an axicon lens material having a refractive index of 1.5. For this case, from EQUATION 21, α=40 degrees, thus, (1-tan φ tan α)≈0.75. If the image detector pixel pitch is approximately 7 microns and an image line width of approximately 6 pixels=42 microns is desired, then from EQUATION 22, R=56 microns. R can alternatively be controlled by an aperture on either side of the axicon lens 615, or by otherwise controlling a beam radius of the collimated light 640. However, if either of these techniques results in illumination that is not concentric with the optical axis 641, then the image line width around the resulting structured light image will be asymmetric, and this asymmetry may also vary for various lenses arranged on a target member, which may lead to systematic errors. Thus, in various exemplary embodiments it is more convenient and consistent for the collimated light 640 to overfill the axicon lens 615, which can economically provide the desired line width symmetry, and reduce or eliminate the need for special alignment or assembly procedures.

The paths of the central rays 626 and 626' converge to, and diverge from, a point referred to herein as the target source vertex 615', because it is the nominal vertex of the structured light cone 642. The target source vertex 615' is spaced apart from the lens vertex 608 by a distance f along the optical axis 641. For an overfilled lens of radius R:

$$f = \frac{R}{2} * (1 - \tan\varphi \tan\alpha) \quad \text{(Eq. 23)}$$

Figure 14:
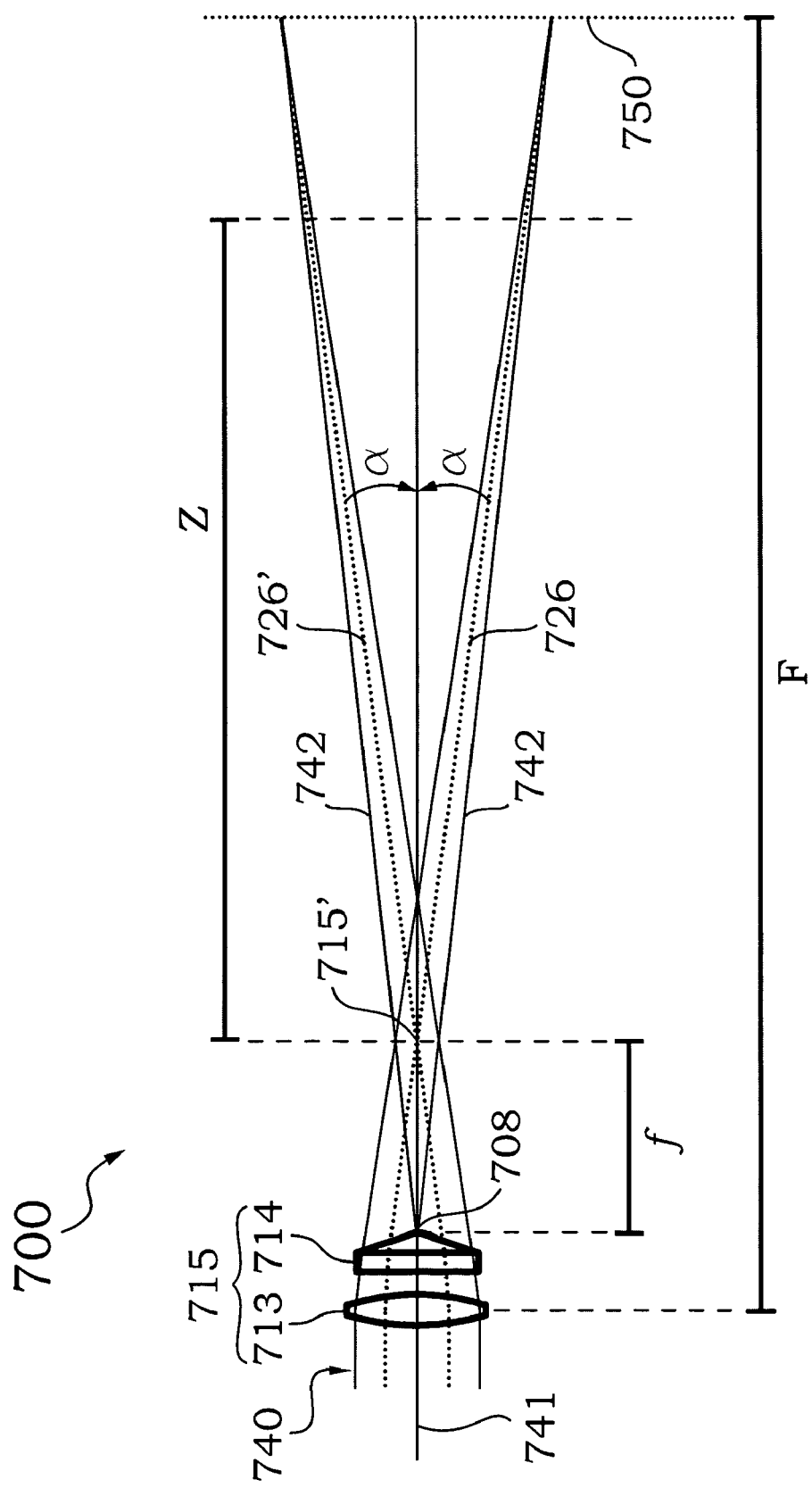
FIG. 14 depicts the characteristics of a second generic axicon lens target source configuration that is usable according to this invention, which includes a converging lens between the light source and the axicon lens, causing adjacent rays of a structured light cone to converge at a plane to form a well-focused structured light ring image.

FIG. 14 shows a schematic side view of a second exemplary axicon lens target source configuration 700 that is usable according to this invention. The target source configuration 700 includes various elements and operating principles which are similar to the target source configuration 600 described above. Elements numbered 7XX in FIG. 14 will be understood to be similar in function to the similarly numbered elements 6XX in FIG. 13, unless otherwise indicated. Due to the basic similarities in design and operation between the target source configurations 600 and 700, only the varying aspects of the target source configuration 700 that require additional explanation are described below. It should be appreciated that the vertical and horizontal dimensions of FIG. 14 are not drawn to scale. In particular, the focal length F may be chosen to be much longer than its apparent representation in FIG. 14.

The target source configuration 700 includes a composite target source 715 that includes a converging lens 713 that receives the collimated light 740 and directs slightly converging rays to a "matching" axicon lens 714. Thus, the composite target source 715 is designed such that adjacent rays of the structured light cone 742' converge at a focal plane 750 at a distance from the composite target source 715. As a design guideline, the distance from the converging lens 713 to the focal plane 750 is roughly the same as the focal length of the converging lens 713, even though the axicon lens 714 has been introduced into the optical path. Additional design considerations for such a lens system, including various beneficial modifications that may be added near the vertex 708 of the axicon lens 714, are described in detail in the article "Characterization And Modeling Of The Hollow Beam Produced By A Real Conical Lens", by Benoit De'pret, et. al., *Optical Communications*, 211, pp. 31-38, October, 2002, which is incorporated herein by reference. Therefore, additional design and operating aspects of the target source configuration 700 need not be discussed here.

The essential point of the target source configuration 700 is simply that it provides one means of compensating for undesirable divergence of the wall(s) of a structured light cone according to this invention, and the resulting blurring and/or width increase of the image lines that may otherwise occur for values of Z near the maximum range of a position sensor. (The target source configuration 600 shown in FIG. 13, provides one example where this might occur, due to practical fabrication imperfections, for example.)

In one exemplary embodiment, the design location for the focal plane 750 is beyond the desired maximum Z-range, such that the theoretical minimum image line width within the maximum Z range corresponds to approximately 3-6 pixels on the image detector of the position sensor. In another embodiment, the design location for the focal plane 750 is within the Z-range. In such an embodiment, a narrower image line width remains operable within the expected Z range, and/or imperfect collimation, optical aberration, or various other potential "blurring" effects provide a "cone wall beam waist" that provides a desirable minimum image line width.

Of course, various other lens configurations can provide the same function as the composite target source 715, such as a single "slightly convex axicon", or the like. Such lens configurations can be determined by one skilled in the art and developed by analytical design and/or experimentation.

Figure 15:
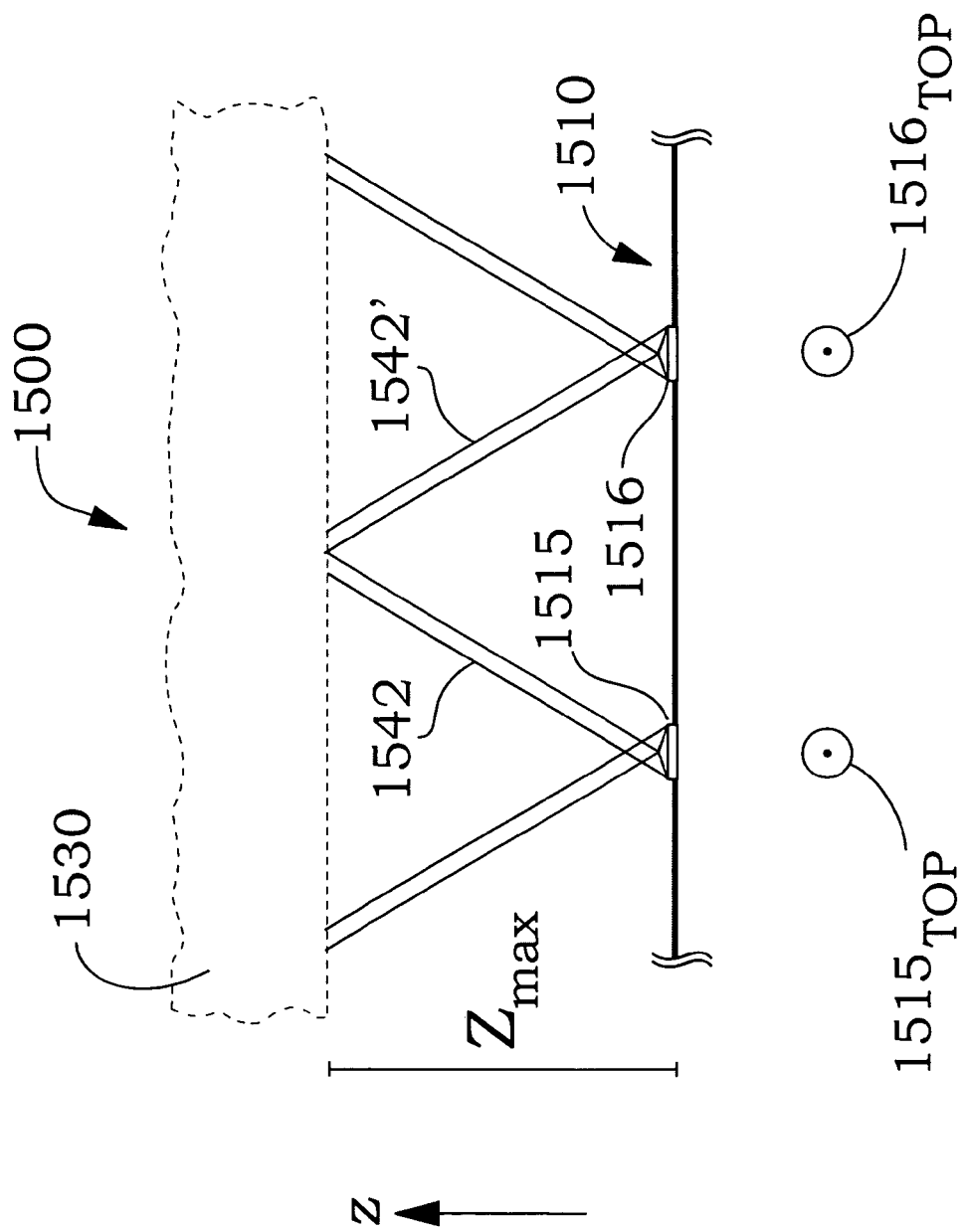
FIGS. 15-17 illustrate views along the X-Y plane and along the Z axis, for each of three exemplary target source lens arrangements and the related structured light patterns, that are usable in various exemplary embodiments according to this invention.
Figure 16:
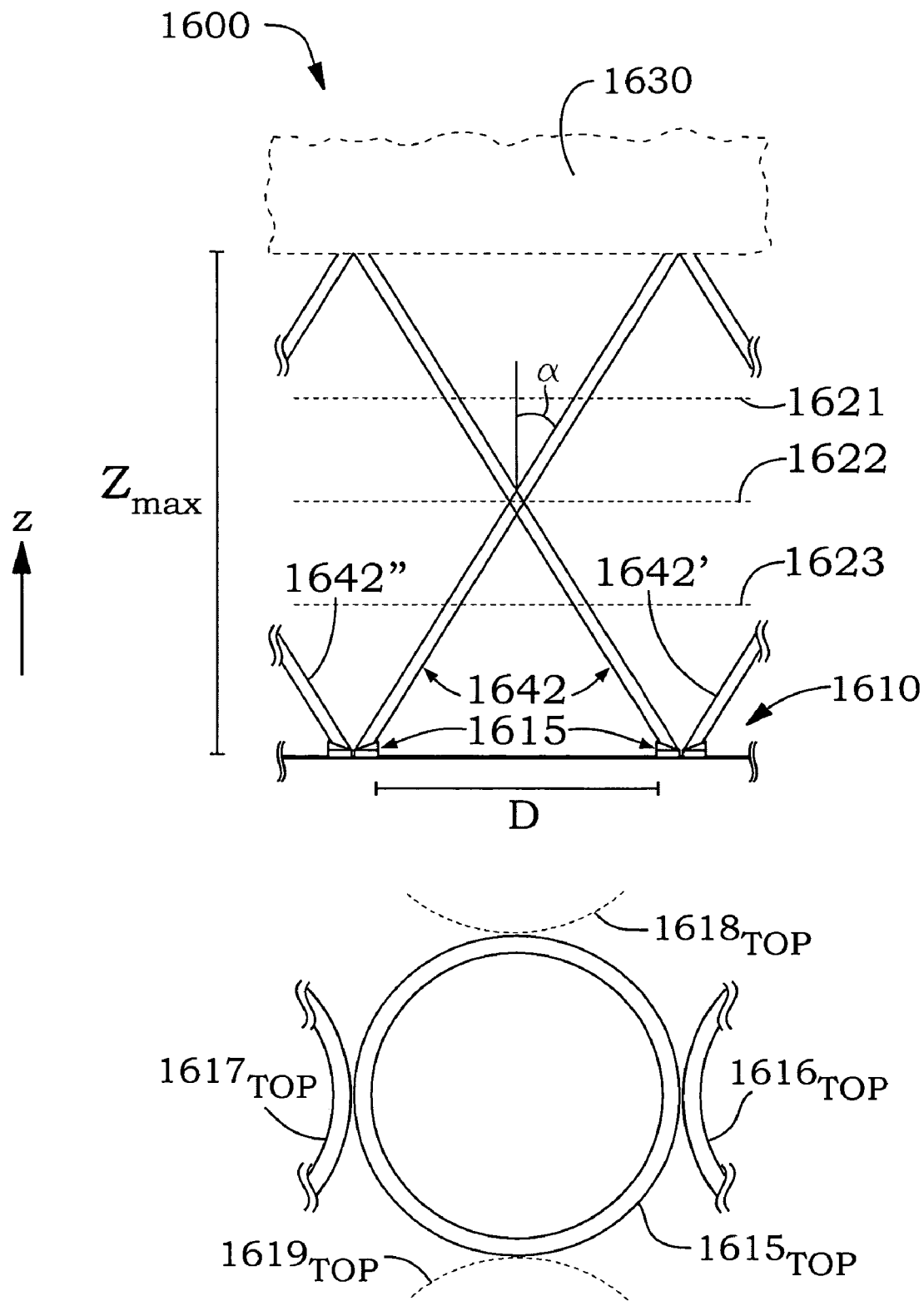
Figure 17:
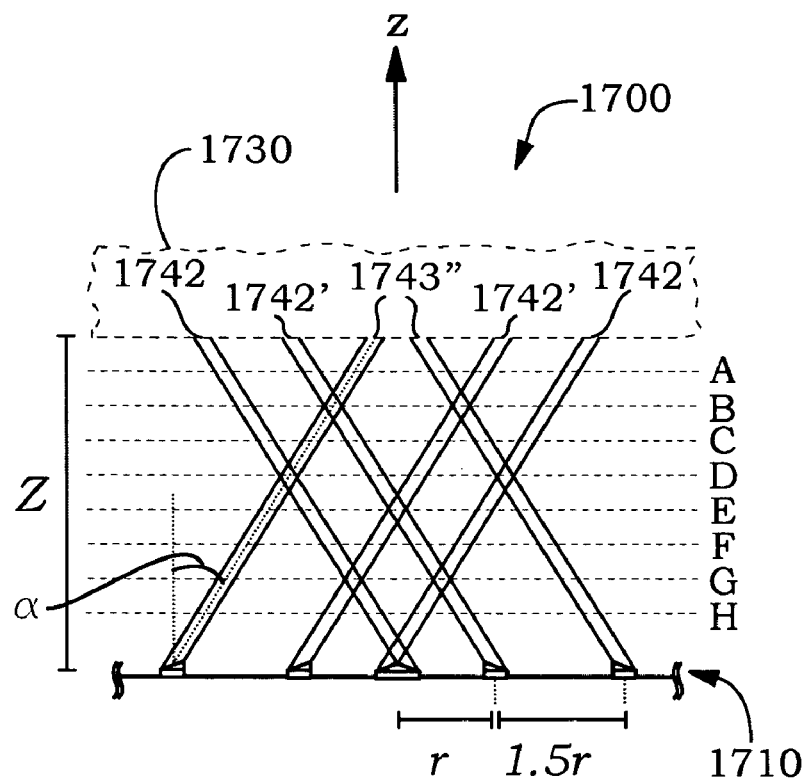
Figure 17:
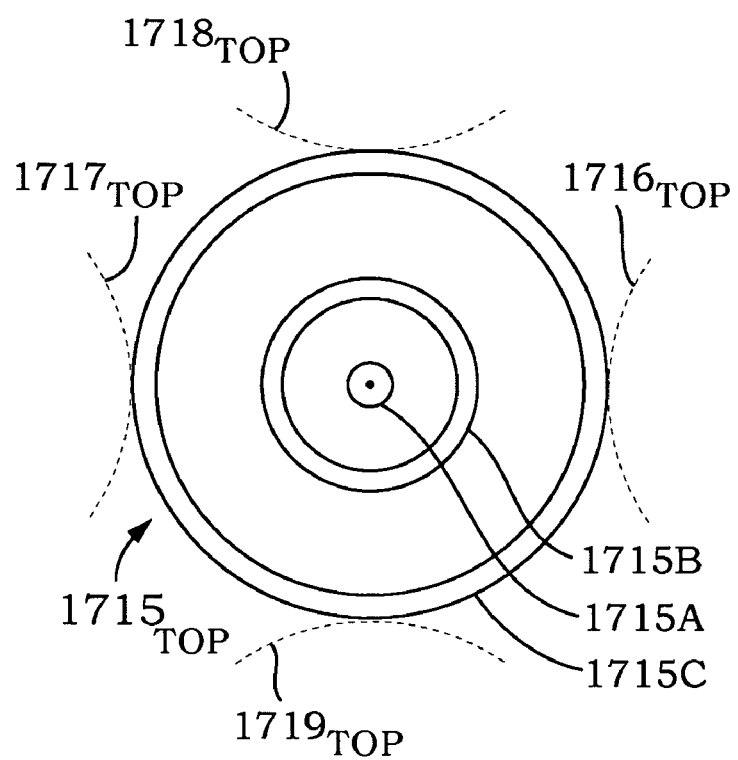

FIGS. 15-17 show three exemplary target source configurations and various aspects of the resulting structured light patterns. FIG. 15 shows a schematic side view of a target source configuration 1500 that is functionally the same as the target source configuration 600, except that two adjacent axicon lenses 1515 and 1516 are shown on a portion of a target member 1510, to indicate the relationship between the adjacent structured light cones 1542 and 1542'. An image detector 1530 is also shown. The axicon lenses 1515 and 1516 are shown in the upper side view illustration, and also in a top view illustration where they are numbered 1515$_{TOP}$ and 1516$_{TOP}$, respectively. The configuration shown in FIG. 15 is essentially the same as that described with reference to FIGS. 2-5 above, and is shown here primarily for convenient comparison to the following descriptions of FIGS. 16 and 17. FIG. 15 shows a maximum range $Z_{MAX}$, which corresponds to the range where the structured light cones 1542 and 1542' do not overlap. This consideration has been previously discussed with reference to EQUATION 7.

FIG. 16 shows a schematic side view of a target source configuration 1600. Where a subscript "TOP" is added to any reference number in FIG. 16, it will be understood that the element referred to is shown from a top view. Non-subscripted reference numbers are used for the side view of the same elements. The target source configuration 1600 includes a ring-shaped target source 1615 that produces a structured light pattern 1642, that may be described as a pair of structured light cones, one inverted and one not, with a common vertex at the plane 1622. Thus, the use of the structured light pattern 1642 to determine the (x,y,z) coordinates will be understood by one skilled in the art, having benefit of this disclosure. For example, the plane 1622 is analogous to the light point plane(s) previously described herein, including the target source vertices, which define that plane. However, in this case, both "positive" and "negative" Z values may be determined for the light point plane 1622. The advantage of this configuration 1600 is that the maximum Z range where adjacent structure light patterns do not overlap is doubled in comparison to the similar maximum Z range of the configuration 1500.

Of course, for this configuration 1600 there will be a position ambiguity for +/−z-coordinates (about the light point plane 1622) which are of the same magnitude, such as the pair of planes 1621 and 1623. In various exemplary embodiments, this potential ambiguity is resolved by one of various possible means at the level of the system that hosts, or uses, a position sensor that incorporates the target source configuration 1600. For example, started from a known initial position, the relative motion between the target member 1610 and the image detector 1630 may be tracked or accumulated, or the motion control signals used to provide the relative motion may be analyzed, or both, in order to distinguish between potential ambiguous positions.

Regarding the ring-shaped target source 1615, it has a nominal diameter D, and a cross-section that is identical to that of half of an axicon lens, in order to provide the cone angle α. Thus, the angle used for the ring-shaped lens of the target source 1615 may be designed and/or determined essentially as previously described with reference to FIG. 13 and EQUATIONS 21-23. Portions of the surface of the target member 1610 other than the ring-shaped lens(es) of the target source 1615 and the like, are made opaque by any convenient means. In one embodiment, the target member 1610 includes a film pattern that passes collimated light through ring-shaped pattern openings that effectively define the width of the wall(s) of the structured light pattern 1642, and the like. That is, the thin film pattern transmits light through pattern openings that under-fill the ring-shaped lenses that form the ring-shaped target sources 1615. The lenses may be formed concentrically with the ring-shaped openings by any convenient means, for example, by applying preformed lenses, by micro-molding lenses in place, by micro-embossing a polymer coating, or any other suitable now known or later-developed method. It should be appreciated that when the aforementioned thin film pattern (or the like) is used, that excess material outside of the region of the light-transmitting openings, and outside of the lens regions, has no deleterious effect.

FIG. 16 also shows portions of similar adjacent ring-shaped target sources 1616-1619, along with portions of adjacent structured light patterns 1642' and 1642", corresponding to target sources 1616 and 1617, respectively. Thus, such ring-shaped lenses form a corresponding array on the target member 1610 in various exemplary embodiments according to this invention.

FIG. 17 shows a schematic side view of a target source configuration 1700 that provides an extended Z range similar to that provided by the target source configuration 1600. However, the target source configuration 1700 uses an arrangement of lenses that provide structured light patterns that can provide unambiguous z-coordinate determinations throughout the entire Z range. Where a subscript "TOP" is added to any reference number in FIG. 17, it will be understood that the element referred to is shown from a top view. Non-subscripted reference numbers are used for the side view of the same elements.

The target source configuration 1700 includes concentric ring-shaped target sources 1715B and 1715C that produce structured light patterns 1742' and 1742". The structured light pattern 1742' is similar to the structured light pattern 1642 described with reference to FIG. 16. The structured light pattern 1742" is an inverted cone. The target source configuration 1700 also includes a concentric axicon lens 1715A, that produces the structured light pattern 1742, which is similar to the structured light pattern 1542 described with reference to FIG. 15. All lenses, and the target member 1710 overall, may be fabricated in a manner analogous to previous descriptions for similar elements.

As shown in FIG. 17, the target source 1715B has a nominal radius r and the target source 1715C has a nominal radius of 2.5r. This configuration assures that for any separation Z between the target member 1710 and the image detector 1730, a structured light image will be provided that has a configuration of "nested" ellipses that have a unique size relationship that is specific to that Z value.

It is possible to construct an algorithm which completely describes the correlation between the ellipse parameters and Z. For example, consider the illustrated case where a pattern of "circular ellipse" light rings are provided at the set of hypothetical planes A to H. To determine which lens on the target member 1710 is causing each light ring, the radii of the light rings are compared. On planes A to B, the distance between the outer two light rings is equal to r, and there is also an inner ring. On planes B to D, the distance between the innermost and outermost light rings is equal to r. On planes H to G, the distance between the innermost and outermost light rings is equal to 1.5.r and there is also an inner ring. On planes G to E, the distance between the innermost and outermost light rings is equal to 1.5r. On planes E to D, the distance between the inner two light rings is equal to r, and there is also an outer ring. Thus, it is apparent that each plane has a unique decipherable ring configuration. Of course, the size of each respective light ring either increases or decreases in a known manner in proportion to Z. Thus, Z may be determined with high accuracy and resolution as previously described herein, and without ambiguity, over the entire Z range. In application, the light rings in the images will typically be ellipses, as previously described herein. However, in such cases, certain parameters of the ellipses in each nested set of ellipses will have relationships analogous to the relationships between radii discussed above. For example, the minor axes of the ellipses will behave very similarly over a reasonable range of tilt angles. Thus, relationships based on determined ellipse parameters, or combinations of determined ellipse parameters can be used to determine Z values, without ambiguity, over the entire Z range.

FIG. 17 also shows portions of similar adjacent ring-shaped target sources 1716-1719. Thus, such ring-shaped lenses form a corresponding array on the target member 1710 in various exemplary embodiments according to this invention.

Figure 18:
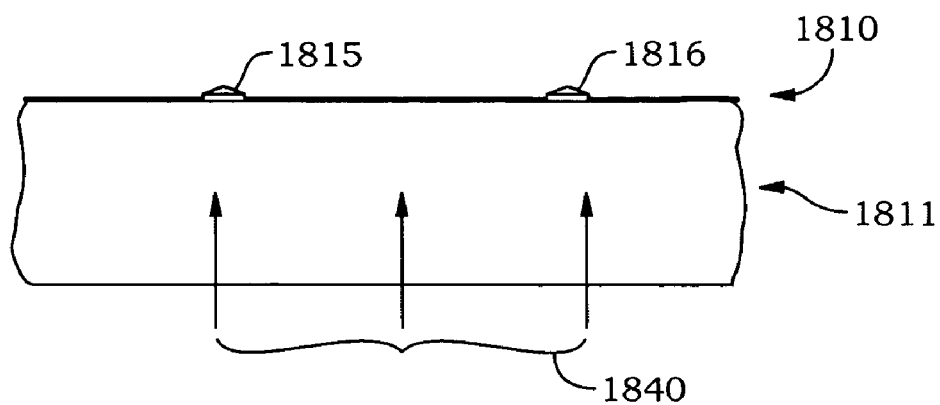
FIG. 18 illustrates a first exemplary illumination configuration for a structured light target member using collimated light and axicon lens target sources.

FIG. 18 illustrates one exemplary illumination configuration for a portion of a structured light target member 1810 usable according to this invention. The target member 1810 is illuminated by collimated light 1840 that illuminates at least the portion of the target member 1810 that is imaged onto a position sensor image detector, or the entire target member 1810. The use and production of collimated light is well known, and the collimated light 1840 may be provided according to any now known or later developed method, provided that the collimated light remains aligned in a fixed relationship along, or nearly along, the optical axis of the axicon lenses, regardless of any motion of the target member 1810.

In the embodiment shown in FIG. 18, the axicon lens target sources 1815 and 1816 are located on a transparent substrate 1811, which may be, for example, borosilicate glass having a thickness of approximately 1-3 mm or more, depending on the overall size of the target member 1810 and the required mechanical strength and stiffness in a particular application. Except for the area coinciding with the axicon lens target sources 1815 and 1816, the surface of the transparent substrate 1811 that carries the lenses is covered with an opaque coating. In one embodiment the coating is a thin film coating, as previously described with reference to FIG. 16.

Figure 19A:
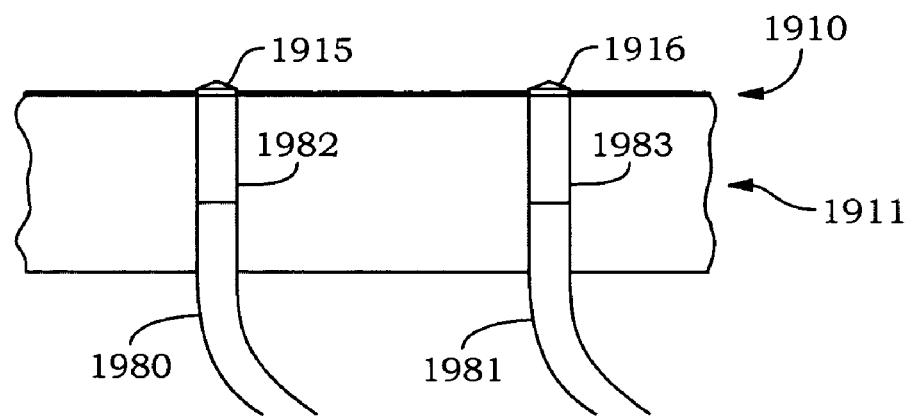
FIGS. 19A and 19B illustrate a second exemplary illumination configuration for a structured light target member using light from optical fibers and axicon lens target sources.
Figure 19B:
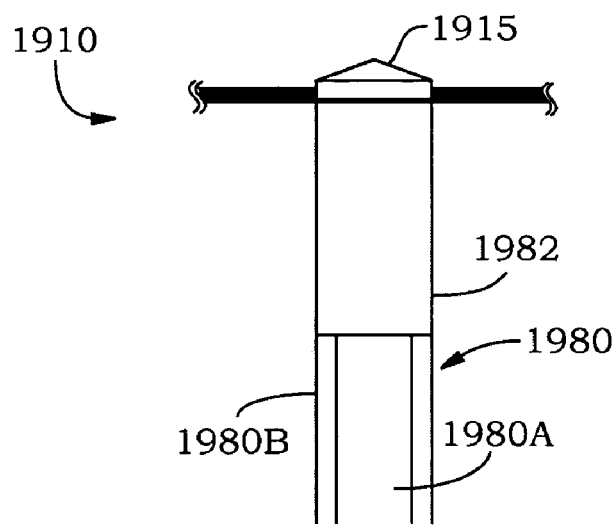

FIG. 19A and 19B illustrate another exemplary illumination configuration for a portion of a structured light target member 1910 usable according to this invention. As best seen in the less detailed FIG. 19A, representative respective axicon lens target sources 1915 and 1916 abut the ends of respective gradient index lenses 1982 and 1983. The respective gradient index lenses 1982 and 1983 abut, and receive light from, respective single-mode optical fibers 1980 and 1981, which receive light (meaning any operable spectrum or wavelength of light detectable by a corresponding image detector) from a light source (not shown) that is located at any convenient position. The characteristics of the gradient index lenses 1982 and 1983 and the single-mode optical fibers 1980 and 1981 are selected by analysis and/or experiment to provide collimated light to the axicon lens target sources 1915 and 1916. The optical fibers, gradient index lenses, and axicon lens target sources may be assembled by any now known or later developed method. For example by methods commonly used in the telecommunications industry. In one embodiment, holes are fabricated in the substrate 1911 with precise tolerances, and the various optical components are inserted and aligned in the holes and fixed in position by suitable optical grade adhesives. FIG. 19B shows a magnified portion of the target member 1910, and shows both the core 1980A and the cladding 1980B of the single mode fiber 1980.

Figure 20:
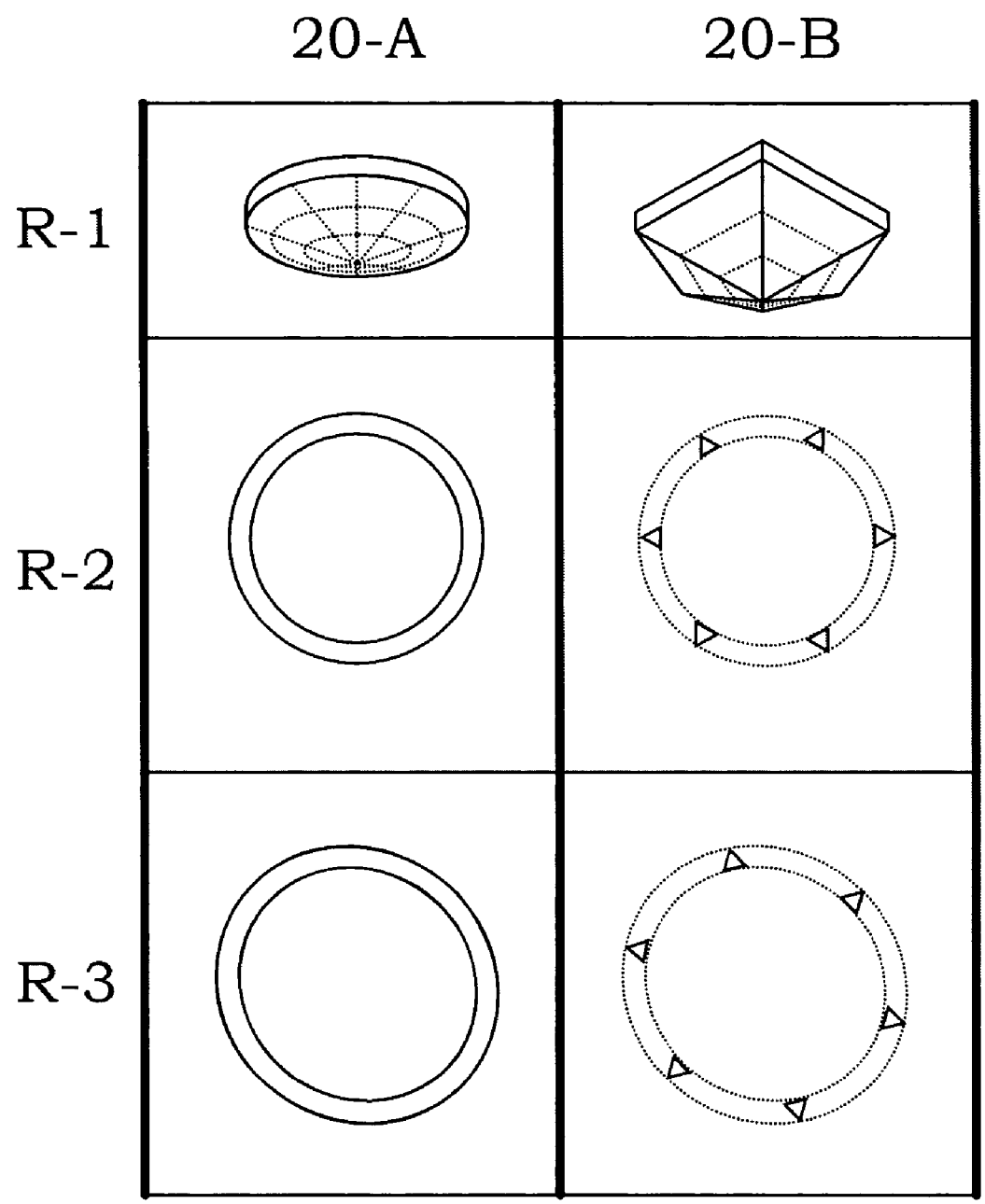
FIG. 20 is a table comparing the characteristics of a conventional conical axicon lens and an alternative "faceted" axicon-like lens that is usable in a target source in various exemplary embodiments according to this invention.

FIG. 20 is a table comparing the characteristics of a conventional conical axicon lens and an alternative faceted "axicon-like" lens that is usable in a target source in various exemplary embodiments according to this invention. The conventional axicon lens is shown in column 20-A. Along that column, cell R-1 shows the conventional axicon lens, cell R-2 shows a circular structured light image that is provided by the conventional axicon lens when the image plane is normal to the optical axis of the lens, and cell R-3 shows an elliptical structured light image that is provided by the conventional axicon lens when the image plane is angled relative to the optical axis of the lens.

One exemplary embodiment of an alternative faceted "axicon-like" lens is shown in column 20-B. In order to illustrate the operation of such a lens, it is assumed to be fabricated with a facet base angle that is the same as the axicon base angle of the lens shown in column 20-A. Along the column 20-B, cell R-1 shows the faceted "axicon-like" lens, which has 6 faces in this embodiment.

For comparison, cell R-2 of column 20-B reproduces the circular structured light image that is provided by the conventional axicon lens and shown in cell (R-2,20-A) in dashed outline, and superimposes the "discrete" structured light image provided by the faceted lens. As can be seen in that cell R-2, the faceted lens provides 6 discrete light spots, that are nominally individual triangles corresponding to the 6 facets of the faceted lens. When both of the lenses along row R-1 have approximately the same radial dimension, and the same base angle, the discrete structured light image spots provided by the faceted lens will form image patterns that coincide with the shape and image line width of the previously described continuous images of the corresponding conventional axicon lens. Cell R-3 of column 20-B shows an elliptical pattern of discrete structured light image spots that is provided by the faceted axicon-like lens when the image plane is angled relative to the optical axis of the lens, along with a superimposed outline of the image from the corresponding convention axicon lens. In general a faceted lens concentrated the source illumination to provide discrete spots that have a relatively high intensity.

It should be appreciated, that using suitable pattern recognition algorithms, such patterns of discrete spots can be recognized. Then ellipses can be fit to them, in a manner analogous to that previously described for the elliptical images provided by the conventional axicon lens. In general 6 or more facets are desirable, and more facets are preferred for higher accuracy and easier pattern recognition.

It should appreciated that it is the structured light pattern that is provided, not a particular lens type, that is crucial to this invention. Accordingly, any operable refractive type lens can be replaced by any other functionally equivalent element. Such elements include, but are not limited to, various types of diffractive optical element (DOE) lenses, including Fresnel lenses, and the like. DOE lenses, including Fresnel lenses, and the like, may be designed and fabricated according to known methods, and may be manufactured as an array on a single substrate, if desired. Custom designed and fabricated DOE lenses, Fresnel lenses, and/or arrays are available from various sources, for example, Digital Optics Corporation, 9815 David Taylor Drive, Charlotte, N.C., USA. DOE lens design techniques are also described in *MICRO-OPTICS: Elements, Systems and Applications*, Edited by Hans Peter Herzig. Taylor & Francis, London, 1970, and *Methods for Computer Design of Diffractive Optical Elements*, Edited by Victor A. Soifer. Wiley-Interscience; John Wiley and Sons, Inc., New York, 2002, which are incorporated herein by reference.

While this invention has been described in conjunction with the exemplary embodiments and configurations outlined above, it is evident that the embodiments and configurations described above are indicative of additional alternative embodiments, configurations, and combinations of design parameter values, as will be apparent to those skilled in the art having benefit of this disclosure. Accordingly, the embodiments of the invention, as set forth above, are intended to be illustrative, not limiting. Various changes may be made without departing from the spirit and scope of the invention.

The invention claimed is:

1. A position measuring device usable for measuring a relative position between two members, the position measuring device comprising:
   an imaging array detector; and
   a structured light generating target member comprising at least three respective target sources that output at least three respective structured light patterns, the output structured light patterns being in a fixed relationship relative to the target member,
   wherein:
   the imaging array detector and the structured light generating target member are positionable to provide a structured light image on the imaging array detector;
   each of the at least three respective target sources gives rise to a corresponding respective image feature in the image on the imaging array detector; and
   a size characteristic of each of the at least three corresponding respective image features in the image is usable to determine a z-coordinate value for a respective reference point that is fixed relative to the corresponding respective target source, the z-coordinate value corresponding to a translational degree of freedom along a z-axis that extends along a direction of varying separation between the imaging array detector and the target member.

2. The position measuring device of claim 1, wherein:
   the locations of a plurality of the corresponding respective image features in the image are usable in conjunction with their respective size characteristics to determine (x,y,z) coordinate values for the corresponding respective target sources, wherein the x-coordinate value and the y-coordinate value correspond to two franslational degrees of freedom in a plane that is perendicular to the z-axis.

3. The position measuring device of claim 2, further comprising a signal processing unit configured to input and analyze at least one structured light image, determine the respective size characteristics and locations of the plurality of the corresponding respective image features in the image, determine the (x,y,z) coordinate values for the corresponding respective target sources; and determine a six degree of freedom relative position between the imaging detector and the target member based on the determined (x,y,z) coordinate values.

4. The position measuring device of claim 3, wherein:
a plurality of respective target sources are each configured such that they each give rise to a corresponding respective image feature comprising a respective elliptical pattern in the image when a plane of the target member is not parallel to a plane of the imaging array detector;
the signal processing unit is configured to fit respective ellipses to respective elliptical patterns,
the determined respective size characteristics comprise the dimensions of the major and minor axes of the respective ellipses fit to respective elliptical patterns; and
the detennined respective locations comprise the center of the respective ellipses fit to respective elliptical patterns.

5. The position measuring device of claim 4, wherein each respective elliptical pattern in the image exhibits a set of radial intensity profiles, each radial intensity profile comprising the intensity values of a set of image pixels of the elliptical pattern lying along one corresponding radial direction extending from a nominal center of the respective elliptical pattern, and the signal processing unit is configured to;
determine the location of a radial intensity profile peak for each member of the set of radial intensity profiles corresponding to a respective elliptical pattern; and
fit a respective ellipse to the determined locations of the radial intensity profile peaks corresponding to tat respective elliptical pattern.

6. The position measuring device of claim 2, wherein the structured light generating target member comprises a two-dimensional array of respective target sources that output respective structured light patterns, and the two-dimensional array of respective target sources is periodic along each of two directions.

7. The position measuring device of claim 1, wherein a plurality of the respective target sources are configured such that each of their respective image features comprise at least one of a ring-shaped pattern that is continuous in the image and a ring-shaped pattern that consists of a group of discrete light spots in the image.

8. The position measuring device of claim 7, wherein the ring-shaped pattern is an elliptical pattern when a plane of the target member is not parallel to a plane of the imaging array detector.

9. The position measuring device of claim 8, wherein the plurality of the respective target sources are configured such that the dimension of each ellipse-shaped pattern across its minor axis is linearly related to the z-coordinate value corresponding to the respective target source that gives rise to the ellipse in the image.

10. The position measuring device of claim 8, wherein a plurality of respective target sources each comprise an optical element that has an optical axis, and that inputs collimated light from a light source parallel to its optical axis, and outputs a respective structured light pattern.

11. The position measuring device of claim 10, wherein the optical element outputs a stuctured light pattern comprising rays distributed in a pattern that nominally coincides with at least of part of a conical surface of revolution, the structured light pattern having a cross-section that forms a ring-shaped pattern in a plane perpendicular to the optical axis, and wherein the rays each form approximately the same cone angle relative the optical axis.

12. The position measuring device of claim 11, wherein the optical element comprises at least one of a refractive axicon lens, a refractive fbceted pramidal lens, a ring-shaped lens having a prismatic cross-section, a diffiactive optical element that provides the effect of a refractive axicon lens, a diffractive optical element that provides the effect of a refractive faceted pyramidal lens, and a diffractive optical element that provides the effect of a ring-shaped lens having a prismatic cross-section.

13. A method for measuring a relative position between two members, the method comprising:
providing an imaging detector;
providing a structured light generating target member comprising at least three respective target sources that output at least three respective structured light patterns, the output structured light patterns being in a fixed relationship relative to the target member;
positioning the imaging array detector and the structured light generating target member to provide a structured light image on the imaging array detector;
providing an image an the imaging array detector, wherein each of the at least three respective target sources gives rise to a corresponding respective image feature in the image; and
for each of the at least three corresponding respective image features in the image, determining a size characteristic of that respective image feature and using the size characteristic to determine a z-coordinate value for a respective reference point that is fixed relative to the corresponding respective target source, each z-coordinate value corresponding to a translational degee of freedom along a z-axis that extends along a direction of varying separation between the imaging array detector and the target member.

14. The method of claim 13, the method further comprising:
determining the locations of a plurality of the corresponding respective image features in the image; and
using the determined locations of the plurality of the corresponding respective image features in the image, in conjunction with their respective size characteristics, to determine (x,y,z) coordinate values for the corresponding respective target sources, wherein the x-coordinate value and the y-co ordinate value correspond to two translational degrees of freedom in a plane that is perpendicular to the z-axis.

15. The method of claim 14, the method further comprising:
determining a six degree of freedom relative position between the imaging detector and the target member based on the determined (x,y,z) coordinate values.

16. The methodof claim 14, wherein:
a plurality of respective target sources are each configured such that they each give rise to a corresponding respective image feature comprising a respective elliptical pattern in the image when a plane of the target member is not parallel to a plane of the imaging array detector;
determining a size characteristic and location of a respective image feature in the image comprises fitting respective ellipses to its respective elliptical patterns; and
the determined respective size characteristics comprise the dimensions of the major and minor axes of the respective ellipses fit to respective elliptical patterns, and the determined respective locations comprise the center of the respective ellipses fit to respective elliptical patterns.

17. The method of claim 14, wherein each respective elliptical pattern in the image exhibits a set of radial intensity profiles, each radial intwsity profile comprising the intensity values of a set of image pixels of the elliptical pattern lying along one corresponding radial direction extending from a nominal center of the respective elliptical pattern, and fitting a respective ellipses to its respective elliptical pattern comprises:

determining the location of a radial intensity profile peak for each member of the set of radial intensity profiles corresponding to a respective elliptical pattern; and fitting a respective ellipse to the determined locations of the radial intensity profile peaks corresponding to that respective elliptical pattern.

* * * * *

UNITED STATES PATENT AND TRADEMARK OFFICE
CERTIFICATE OF CORRECTION

PATENT NO. : 7,307,736 B2
APPLICATION NO. : 10/815893
DATED : December 11, 2007
INVENTOR(S) : J. D. Tobiason et al.

It is certified that error appears in the above-identified patent and that said Letters Patent is hereby corrected as shown below:

| COLUMN | LINE | ERROR |
|---|---|---|
| 10 | 30 | "approprate" should read --appropriate-- |
| 30 (Claim 2, | 55 line 7) | "franslational" should read --translational-- |
| 30 (Claim 2, | 56 line 8) | "perendicular" should read --perpendicular-- |
| 31 (Claim 4, | 13 line 13) | "detennined" should read --determined-- |
| 31 (Claim 5, | 23 line 8) | "to;" should read --to:-- |
| 31 (Claim 5, | 28 line 13) | "tat" should read --that-- |
| 31 (Claim 11, | 58 line 2) | "stuctured" should read --structured-- |
| 31 (Claim 11, | 60 line 4) | "at least of part of" should read --at least part of-- |
| 31 (Claim 11, | 64 line 8) | "relative the" should read --relative to the-- |
| 31 (Claim 12, | 67 line 3) | "fbceted pramidal" should read --faceted pyramidal-- |
| 32 (Claim 12, | 1 line 4) | "diffiactive" should read --diffractive-- |
| 32 (Claim 13, | 29 line 22) | "degee" should read --degree-- |

UNITED STATES PATENT AND TRADEMARK OFFICE
CERTIFICATE OF CORRECTION

PATENT NO. : 7,307,736 B2
APPLICATION NO. : 10/815893
DATED : December 11, 2007
INVENTOR(S) : J. D. Tobiason et al.

It is certified that error appears in the above-identified patent and that said Letters Patent is hereby corrected as shown below:

| COLUMN | LINE | ERROR |
|---|---|---|
| 32 (Claim 16, | 51 line 1) | "methodof" should read --method of-- |
| 33 (Claim 17, | 3 line 3) | "intwsity" should read --intensity-- |
| 33 (Claim 17, | 7 line 7 | "a respective ellipses" should read --a respective ellipse-- |

Signed and Sealed this

First Day of July, 2008

JON W. DUDAS
*Director of the United States Patent and Trademark Office*